United States Patent
Iizuka et al.

(10) Patent No.: US 7,202,997 B2
(45) Date of Patent: Apr. 10, 2007

(54) OPTICAL AMPLIFIER AND OPTICAL AMPLIFIER CONTROL METHOD

(75) Inventors: Hiroshi Iizuka, Kawasaki (JP); Kosuke Komaki, Kawasaki (JP); Hiroyuki Itou, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 174 days.

(21) Appl. No.: 10/716,361

(22) Filed: Nov. 17, 2003

(65) Prior Publication Data

US 2004/0100688 A1 May 27, 2004

(30) Foreign Application Priority Data

Nov. 18, 2002 (JP) .............................. 2002-333501

(51) Int. Cl.
*H04B 10/17* (2006.01)

(52) U.S. Cl. .............................. 359/341.41; 359/341.42

(58) Field of Classification Search ............. 359/337.4, 359/341.41, 341.42
See application file for complete search history.

(56) References Cited

U.S. PATENT DOCUMENTS

| | | | |
|---|---|---|---|
| 5,805,322 A | 9/1998 | Tomofuji | |
| 5,889,609 A | 3/1999 | Fukushima | |
| 5,966,237 A | 10/1999 | Sugaya et al. | |
| 5,986,799 A * | 11/1999 | Itou et al. | 359/337 |
| 6,055,092 A | 4/2000 | Sugaya et al. | |
| 6,061,171 A | 5/2000 | Taylor et al. | |
| 6,288,874 B1 | 9/2001 | Ito | |
| 6,359,726 B1 * | 3/2002 | Onaka et al. | 359/337.1 |
| 6,369,938 B1 | 4/2002 | Sugaya et al. | |
| 6,411,430 B1 | 6/2002 | Ogino et al. | |
| 6,421,169 B1 | 7/2002 | Bonnedal et al. | |
| 6,483,632 B1 * | 11/2002 | Jolley et al. | 359/337.4 |
| 6,560,008 B1 | 5/2003 | Wada | |
| 6,603,596 B2 | 8/2003 | Inagaki et al. | |
| 6,687,045 B2 | 2/2004 | Lelic | |
| 6,690,506 B2 * | 2/2004 | Zahnley et al. | 359/337.11 |

(Continued)

FOREIGN PATENT DOCUMENTS

EP 0 944 190 9/1999

(Continued)

OTHER PUBLICATIONS

H. Suzuki et al. Dynamic Gain Control by Maximum Signal Power Channel in Optical Linear Repeaters for WDM Photonic Transport Networks. IEEE Photonics Technology Letters, IEE Inc. New York, U.S. vol. 10, No. 5, May 1, 1998, pp. 734-736.

(Continued)

*Primary Examiner*—Jack Keith
*Assistant Examiner*—Ari M Diacou
(74) *Attorney, Agent, or Firm*—Katten Muchin Rosenman LLP

(57) ABSTRACT

An optical amplifier includes first and second optical amplifier units, a variable optical attenuator optically coupled between the first and second optical amplifier units, a first control unit to control gains of the first and second optical amplifier units based on an input of the first optical amplifier unit and an output of the second optical amplifier unit, and a second control unit to control an attenuation quantity of the variable optical attenuator based on the input and an output of the first optical amplifier unit and an input and the output of the second optical amplifier unit.

5 Claims, 19 Drawing Sheets

U.S. PATENT DOCUMENTS

| | | |
|---|---|---|
| 6,768,578 B1 * | 7/2004 | Kinoshita et al. ............ 359/337 |
| 6,922,282 B2 * | 7/2005 | Onaka et al. .......... 359/341.32 |
| 2001/0017729 A1 | 8/2001 | Sugaya et al. |
| 2001/0026395 A1 * | 10/2001 | Sugaya et al. ........... 359/337.4 |
| 2002/0044343 A1 | 4/2002 | Manzur |
| 2002/0067538 A1 | 6/2002 | Sugaya et al. |
| 2002/0171917 A1 * | 11/2002 | Lelic et al. .............. 359/341.4 |
| 2003/0035203 A1 | 2/2003 | Shlifer et al. |
| 2003/0231379 A1 | 12/2003 | Komaki et al. |
| 2004/0027651 A1 | 2/2004 | Balland et al. |
| 2004/0085625 A1 | 5/2004 | Motoshima et al. |
| 2004/0100688 A1 | 5/2004 | Iizuka et al. |
| 2004/0114215 A1 | 6/2004 | Tian et al. |

FOREIGN PATENT DOCUMENTS

| | | |
|---|---|---|
| EP | 1 376 904 | 1/2004 |
| JP | 5-244098 | 9/1993 |
| JP | 9-214034 | 8/1997 |
| JP | 11-122192 | 4/1999 |

OTHER PUBLICATIONS

S. Y. Park et al. A gain-flattened two-stage EDFA for WDM optical networks with a fast link control channel. Optics Communications, vol. 153, No. 1-3, Jul. 15, 1998 pp. 23-26.

European Search Report dated Mar. 10, 2005.

* cited by examiner

FIG.10

| CONTROL STATE | INPUT SIGNAL | PD1 | PD3 | PD5 | VOA1_Loss | VOA2_Loss | EDF_total_Gain | AMP_Gain |
|---|---|---|---|---|---|---|---|---|
| INITIAL SETTING | X | X | X | X+A | L1 | L2 | A+L1 | A |
| INPUT CHANGE | X-á | X-á | X-á | X+A-á | L1 | L2 | A+L1 | A |
| CHANGE CORRECTION | X-á | X-á | X | X+A | L1 | L2-α | A+L1+α | A+α |
| EDF_Gain CONTROL | X-á | X-á | X | X+A | L1-α | L2-α | A+L1 | A+α |

FIG.14

| CONTROL STATE | INPUT SIGNAL | PD1 | PD2 | PD3 | VOA_Loss | EDF_total_Gain | AMP_Gain |
|---|---|---|---|---|---|---|---|
| INITIAL SETTING | X | X | X | X+A | L | A+L | A |
| 1 WAVELENGTH CHANNEL INPUT CHANGE | X-α | X-α | X-α | X+A-α | L | A+L | A |
| CHANGE CORRECTION | X-α | X | X-α | X+A | L-α | A+L | A+α |
| EDF_Gain CONTROL | X-α | X | X-α | X+A | L-α | A+L | A+α |

FIG.18

| CONTROL STATE | INPUT SIGNAL | PD3 | PD5 | VOA1_Loss | VOA2_Loss | EDF_total_Gain | AMP_Gain |
|---|---|---|---|---|---|---|---|
| INITIAL SETTING | X | X | X+A | L1 | L2 | A+L1 | A |
| INPUT CHANGE | X−á | X−á | X−α+A | L1 | L2 | A+L1 | A |
| CHANGE CORRECTION | X−á | X | X+A | L1 | L2−α | A+α+L1 | A+α |
| EDF_Gain CONTROL | X−á | X | X+A | L1−á | L2−α | A+L1 | A+α |

FIG.20

| CONTROL STATE | INPUT SIGNAL | PD1 | PD3 | VOA_Loss | EDF_total_Gain | AMP_Gain |
|---|---|---|---|---|---|---|
| INITIAL SETTING | X | X | X+A | L | A+L | A |
| INPUT CHANGE | X−á | X−á | X−α+A | L | A+L | A |
| CHANGE CORRECTION | X−á | X | X+A | L−α | A+L | A+α |
| EDF_Gain CONTROL | X−á | X | X+A | L−α | A+L | A+α |

OPTICAL AMPLIFIER AND OPTICAL AMPLIFIER CONTROL METHOD

BACKGROUND OF THE INVENTION

This application claims the benefit of a Japanese Patent Application No.2002-333501 filed Nov. 18, 2002, in the Japanese Patent Office, the disclosure of which is hereby incorporated by reference. This application is also based on a Japanese Patent Application No.2002-173620 filed Jun. 14, 2002, in the Japanese Patent Office, the disclosure of which is hereby incorporated by reference.

1. Field of the Invention

The present invention generally relates to optical amplifiers and optical amplifier control methods, and more particularly to an optical amplifier for amplifying optical signals (light signals or signal lights) and an optical amplifier control method for controlling such an optical amplifier.

2. Description of the Related Art

Recently, techniques for manufacturing quartz optical fibers having a low loss on the order of 0.2 dB/km, for example, and techniques for utilizing such optical fibers, have been established. Hence, optical communication systems utilizing such optical fibers as transmission lines have been reduced to practice. In such an optical communication system, an optical amplifier is provided to amplify the optical signal, so as to compensate for the loss of the optical fiber and enable a long-distance transmission.

A conventional optical amplifier includes an optical amplifying medium which receives the optical signal to be amplified, and a pumping unit which pumps (or excites) the optical amplifying medium so as to provide a gain band including a wavelength of the optical signal.

For example, an Erbium (Er) Doped Fiber Amplifier (hereinafter simply referred to as an EDFA) has been developed as one example of an optical amplifier for amplifying an optical signal which has a wavelength of the 1.55 μm band and small loss in the quartz optical fiber.

The EDFA includes an Erbium (Er) Doped Fiber (hereinafter simply referred to as an EDF) as the optical amplifying medium, and a pump light source for supplying pump light having a predetermined wavelength to the EDF. The EDFA uses pump light having a wavelength in the 0.98 μm band or the 1.48 μm band, so as to obtain a gain band including a wavelength of 1.55 μm.

A Wavelength Division Multiplexing (WDM) is a technique for increasing a transmission capacity of the optical fiber. In the optical communication system which is applied with the WDM, a plurality of optical carriers having different wavelengths are used, as proposed in a Japanese Laid-Open Patent Application No.11-122192, for example.

In the optical communication system applied with the WDM, a plurality of optical signals obtained by independently modulating each of the optical carriers are wavelength-division-multiplexed by an optical multiplexer, and a resulting WDM optical signal is supplied to an optical fiber transmission line. At a receiving end, the received WDM optical signal is demultiplexed into individual optical signals by an optical demultiplexer, and transmission data are reproduced based on each of the optical signals. Accordingly, in the optical communication system applied with the WDM, the transmission capacity of one optical fiber is increased depending on the number of optical signals which are multiplexed.

In other words, the optical amplifier is used as a linear repeater in the optical communication system applied with the WDM. For this reason, compared to a case where a conventional reproducing repeater is used, it is possible to reduce the number of parts within the repeater and secure reliability of the repeater, and also reduce the cost of the repeater.

When assembling the optical amplifier in the optical communication system applied with the WDM, various controls need to be made with respect to the optical amplifier, due to the necessity to maintain a wavelength characteristic of the gain constant and to prevent waveform deterioration due to non-linear effects of the optical fiber transmission line.

For example, in the EDFA, the wavelength characteristic of the gain changes depending on the gain which is determined by the pumping condition, and thus, an Automatic Gain Control (AGC) is carried out so as to produce an output having a predetermined gain with respect to the input. In this case, if the input changes under the predetermined gain, the output accordingly changes.

On the other hand, from the point of view of a signal-to-noise (S/N) ratio, it is desirable for the optical amplifier to produce a high signal output. However, if the waveform deterioration due to the non-linear effects of the optical fiber transmission line and an input dynamic range at the receiving end are taken into consideration, it is not always desirable for the optical amplifier to produce a high signal output. In other words, there are demands to carry out an Automatic Level Control (ALC), so that the output of the optical amplifier becomes constant within a predetermined range.

As a suitable structure for realizing both the AGC and ALC, an optical amplifier has been proposed which includes first and second optical amplifier units and a variable optical attenuator connected between the first and second optical amplifier units. According to this proposed optical amplifier, the AGC is carried out in each of the first and second optical amplifier units, and the ALC is carried out by the variable optical attenuator.

Such an optical amplifier has been proposed for the following reasons. First, from the point of view of optimizing a Noise Figure (NF) of the entire optical amplifier, it is disadvantageous to provide the variable optical attenuator for the ALC at a preceding stage. Second, from the point of view of securing a predetermined signal output power of the optical amplifier, if the variable optical attenuator for the ALC is provided at a subsequent stage, it is necessary to obtain a high signal output power in the optical amplifier unit for the AGC at an immediately preceding stage, but this is disadvantageous from the point of view of realizing a lower power consumption of a laser diode which is used as the pump light source.

In the optical amplifier having the structure which is suited for realizing both the AGC and the ALC as described above, there is a problem in that the structure of the optical amplifier becomes complex because of the need to independently carry out the AGC in each of the first and second optical amplifier units.

In addition, when using the optical amplifier in the optical communication system applied with the WDM, there is a problem in that the control of the variable optical attenuator for the ALC is complex if a number of channels of the WDM changes. More particularly, when carrying out the ALC to amplify the WDM optical signal in the optical amplifier, a control is carried out so that the total power of the output of the variable optical attenuator becomes constant. Hence, if the number of channels of the WDM optical signal changes during operation of the optical communication system, a target value of the control of the variable optical attenuator becomes different.

The target value of the control of the variable optical attenuator is generally supplied from a monitoring control unit which is provided on an upstream side, and a complex monitoring operation becomes necessary if the wavelength of the optical communication system changes. Moreover, although the attenuation of the variable optical attenuator is temporarily fixed when the wavelength of the optical amplifier changes, it is necessary to carry out operations such as updating the target value of the control depending on the change in the wavelength in a state where an ALC loop is released and closing the ALC loop again, thereby introducing a possibility that the attenuation quantity (amount of attenuation) of the variable optical attenuator will vary during the series of operations.

Since the AGC is carried out continuously in the first and second optical amplifier units, there is a possibility that the output power will vary per wavelength channel when the target value of the control of the variable optical attenuator is switched.

SUMMARY OF THE INVENTION

Accordingly, it is a general object of the present invention to provide a novel and useful optical amplifier and an optical amplifier control method, in which the problems described above are eliminated.

Another and more specific object of the present invention is to provide an optical amplifier and an optical amplifier control method, which can prevent a control error when carrying out an AGC and an ALC, using a relatively simple structure, can easily cope with a change in the wavelength, and is applicable to a WDM.

Still another object of the present invention to provide an optical amplifier comprising first and second optical amplifier units; a variable optical attenuator optically coupled between the first and second optical amplifier units; a first control unit to control gains of the first and second optical amplifier units based on an input of the first optical amplifier unit and an output of the second optical amplifier unit; and a second control unit to control an attenuation quantity of the variable optical attenuator based on the input and an output of the first optical amplifier unit and an input and the output of the second optical amplifier unit. According to the optical amplifier of the present invention, it is possible to prevent a control error when carrying out an AGC and an ALC, using a relatively simple structure, and easily cope with a change in the wavelength, and make it applicable to a WDM. In other words, unlike the conventional case, although the present invention does not carry out the ALC with respect to the variable optical attenuator, the effects of the present invention is as if the ALC were substantially carried out in the optical amplifier as a whole, based on an appropriate combination of the AGC.

A further object of the present invention is to provide an optical amplifier comprising first and second optical amplifier units; a first variable optical attenuator to attenuate an output of the first optical amplifier unit; a second variable optical attenuator to attenuate an input of the first optical amplifier unit; a first control unit to control gains of the first and second optical amplifier units based on an output of the second variable optical attenuator and an output of the second optical amplifier unit; and a second control unit to control attenuation quantities of the first and second variable optical attenuators based on the input and the output of the optical amplifier unit and an input and the output of the second optical amplifier unit. According to the optical amplifier of the present invention, it is possible to prevent a control error when carrying out an AGC and an ALC, using a relatively simple structure, and easily cope with a change in the wavelength, and make it applicable to a WDM.

Another object of the present invention is to provide an optical amplifier comprising first and second optical amplifier units; a variable optical attenuator to attenuate an input and an output of the first optical amplifier unit; a first control unit to control gains of the first and second optical amplifier units based on the input of the first optical amplifier unit which has been attenuated by the variable optical attenuator and an output of the second optical amplifier unit; and a second control unit to control an attenuation quantity of the variable optical attenuator based on the input of the first optical amplifier unit, the input of the first optical amplifier unit which has been attenuated by the variable optical attenuator and the output of the second optical amplifier unit. According to the optical amplifier of the present invention, it is possible to prevent a control error when carrying out an AGC and an ALC, using a relatively simple structure, and easily cope with a change in the wavelength, and make it applicable to a WDM.

Still another object of the present invention is to provide an optical amplifier comprising first and second optical amplifier units; a first variable optical attenuator to attenuate an output of the first optical amplifier unit; a second variable optical attenuator to attenuate an input of the first optical amplifier unit; a first control unit to control gains of the first and second optical amplifier units based on an output of the second variable optical attenuator and an output of the second optical amplifier unit; and a second control unit to control attenuation quantities of the first and second variable optical attenuators based on the output of the second variable optical attenuator, the output of the second optical amplifier unit and characteristics of the first and second variable optical attenuators. According to the optical amplifier of the present invention, it is possible to prevent a control error when carrying out an AGC and an ALC, using a relatively simple structure, and easily cope with a change in the wavelength, and make it applicable to a WDM.

A further object of the present invention is to provide an optical amplifier comprising first and second optical amplifier units; a variable optical attenuator to attenuate an input and an output of the first optical amplifier unit; a first control unit to control gains of the first and second optical amplifier units based on the input of the first optical amplifier unit which has been attenuated by the variable optical attenuator and an output of the second optical amplifier unit; and a second control unit to control an attenuation quantity of the variable optical attenuator based on the input of the first optical amplifier unit which has been attenuated by the variable optical attenuator, the output of the second optical amplifier unit, and a characteristic of the variable optical attenuator. According to the optical amplifier of the present invention, it is possible to prevent a control error when carrying out an AGC and an ALC, using a relatively simple structure, and easily cope with a change in the wavelength, and make it applicable to a WDM.

Another object of the present invention is to provide an optical amplifier control method for controlling an optical amplifier having first and second optical amplifier units and a variable optical attenuator optically coupled between the first and second optical amplifier units, comprising controlling gains of the first and second optical amplifier units based on an input of the first optical amplifier unit and an output of the second optical amplifier unit; and controlling an attenuation quantity of the variable optical attenuator based on the input and an output of the first optical amplifier unit and an input and the output of the second optical amplifier unit. According to the optical amplifier control method of the present invention, it is possible to prevent a control error when carrying out an AGC and an ALC, using a relatively simple structure, and easily cope with a change in the wavelength, and make it applicable to a WDM.

Still another object of the present invention is to provide an optical amplifier control method for controlling an optical amplifier having first and second optical amplifier units, a first variable optical attenuator to attenuate an output of the first optical amplifier unit and a second variable optical attenuator to attenuate an input of the first optical amplifier unit, comprising controlling gains of the first and second optical amplifier units based on an output of the second variable optical attenuator and an output of the second optical amplifier unit; and controlling attenuation quantities of the first and second variable optical attenuators based on the input and the output of the optical amplifier unit and an input and the output of the second optical amplifier unit. According to the optical amplifier control method of the present invention, it is possible to prevent a control error when carrying out an AGC and an ALC, using a relatively simple structure, and easily cope with a change in the wavelength, and make it applicable to a WDM.

A further object of the present invention is to provide n optical amplifier control method for controlling an optical amplifier having first and second optical amplifier units and a variable optical attenuator to attenuate an input and an output of the first optical amplifier unit, comprising controlling gains of the first and second optical amplifier units based on the input of the first optical amplifier unit which has been attenuated by the variable optical attenuator and an output of the second optical amplifier unit; and controlling an attenuation quantity of the variable optical attenuator based on the input of the first optical amplifier unit, the input of the first optical amplifier unit which has been attenuated by the variable optical attenuator and the output of the second optical amplifier unit. According to the optical amplifier control method of the present invention, it is possible to prevent a control error when carrying out an AGC and an ALC, using a relatively simple structure, and easily cope with a change in the wavelength, and make it applicable to a WDM.

Another object of the present invention is to provide an optical amplifier control method for controlling an optical amplifier having first and second optical amplifier units, a first variable optical attenuator to attenuate an output of the first optical amplifier unit and a second variable optical attenuator to attenuate an input of the first optical amplifier unit, comprising controlling gains of the first and second optical amplifier units based on an output of the second variable optical attenuator and an output of the second optical amplifier unit; and controlling attenuation quantities of the first and second variable optical attenuators based on the output of the second variable optical attenuator, the output of the second optical amplifier unit and characteristics of the first and second variable optical attenuators. According to the optical amplifier control method of the present invention, it is possible to prevent a control error when carrying out an AGC and an ALC, using a relatively simple structure, and easily cope with a change in the wavelength, and make it applicable to a WDM.

Still another object of the present invention is to provide an optical amplifier control method for controlling an optical amplifier having first and second optical amplifier units and a variable optical attenuator to attenuate an input and an output of the first optical amplifier unit, comprising controlling gains of the first and second optical amplifier units based on the input of the first optical amplifier unit which has been attenuated by the variable optical attenuator and an output of the second optical amplifier unit; and controlling an attenuation quantity of the variable optical attenuator based on the input of the first optical amplifier unit which has been attenuated by the variable optical attenuator, the output of the second optical amplifier unit, and a characteristic of the variable optical attenuator. According to the optical amplifier control method of the present invention, it is possible to prevent a control error when carrying out an AGC and an ALC, using a relatively simple structure, and easily cope with a change in the wavelength, and make it applicable to a WDM.

Other objects and further features of the present invention will be apparent from the following detailed description when read in conjunction with the accompanying drawings.

BRIEF DESCRIPTION OF THE DRAWINGS

FIG. 10 is a table showing each monitored values of the optical amplifier shown in FIG. 6 and changes in attenuation quantities of the first and second variable optical attenuators;

FIG. 14 is a table showing each monitored values of the optical amplifier shown in FIG. 11 and changes in an attenuation quantity of the variable optical attenuator;

FIG. 18 is a table showing each monitored values of the optical amplifier shown in FIG. 16 and changes in the attenuation quantities of the first and second variable optical attenuators;

FIG. 20 is a table showing each monitored values of the optical amplifier shown in FIG. 19 and changes in the attenuation quantity of the variable optical attenuator.

DESCRIPTION OF THE PREFERRED EMBODIMENTS

Figure 1:
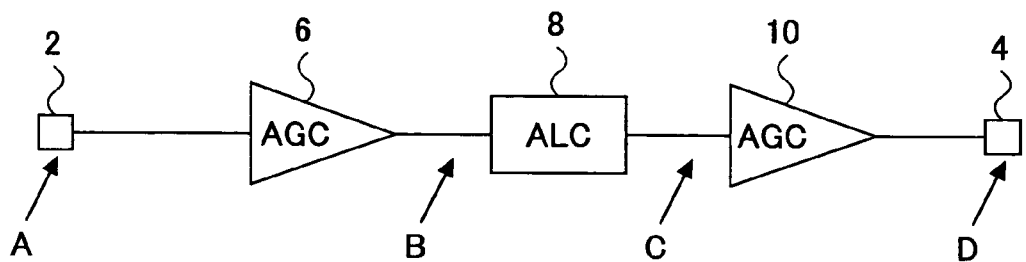
FIG. 1 is a system block diagram showing a suitable structure for carrying out both an AGC and an ALC in an optical amplifier.

A description will be given of various embodiments of an optical amplifier and an optical amplifier control method according to the present invention, by referring to the drawings.

FIG. 1 is a system block diagram showing a suitable structure for carrying out both an AGC and an ALC in an optical amplifier. An AGC unit 6, an ALC unit 8 and an AGC unit 10 are optical connected in this order between an input end 2 and an output end 4. For example, the AGC units 6 and 10 are formed by an EDFA. In addition, the ALC unit 8 is formed by a variable optical attenuator.

In the AGC unit 6 of the preceding stage, even in a case where a power deviation of an input optical signal is generated, the optical amplification by the AGC is carried out by also taking this power deviation into consideration. In the ALC unit 8, a control is carried out so that an optical power of an output optical signal becomes constant. Hence, even in the case where the power deviation of the input optical signal is generated, the ALC unit 8 carries out the control in a direction so as to suppress the power deviation. Accordingly, in the case of a power deviation having a speed which is sufficiently slower than a control time constant of the ALC unit 8, it is possible to completely suppress the power deviation of the input optical signal in the ALC unit 8. In addition, in the ALC unit 8, it is possible to indirectly control an optical power of an output signal at the output end 4 to a desired value by setting the following value as a control target value $P_{ALC}$, where $P_{SIGOUT}$ denotes a target power [dB] of the output optical signal at the output end 4, and $G_B$ denotes a set gain [dB] of the AGC unit 10 of the subsequent stage.

$$P_{ALC}[dB] = P_{SIGOUT} - G_B$$

Since the power deviation is suppressed by the ALC unit 8, the optical power of the input optical signal constant in the AGC unit 10 of the subsequent stage. For this reason, the optical power of the output optical signal of the AGC unit 10 becomes constant depending on the operation of the AGC unit 10, and the value of this optical power of the output signal of the AGC unit 10 becomes a target power at the output end 4.

Figure 2:
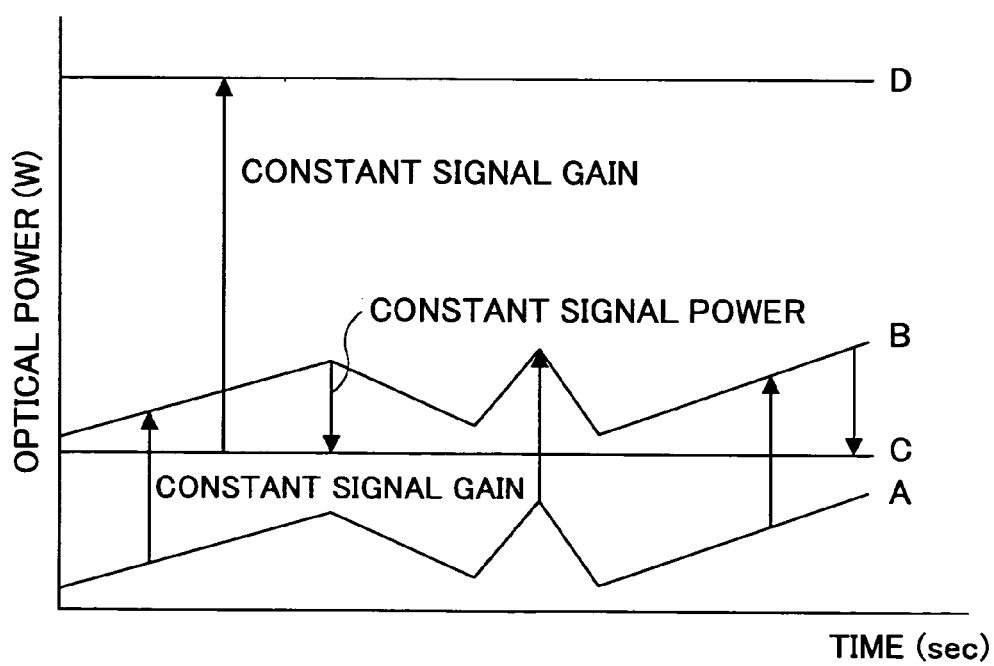
FIG. 2 is a diagram for explaining an operation of the optical amplifier.

FIG. 2 is a diagram for explaining an operation of the optical amplifier having the structure shown in FIG. 1. In FIG. 2, the ordinate indicates an optical power (W), and the abscissa indicates a time (sec).

In FIG. 2, a graph A indicates a change in the optical power of the optical signal at the input end 2, a graph B indicates a change in the optical power of the optical signal at the input of the ALC unit 8. In addition, a graph C indicates a change in the optical power of the optical signal at the input of the AGC unit 10 of the subsequent stage, and a graph D indicates a change in the optical power of the optical signal at the output end 4.

The change in the optical power of the optical signal at the input end 2 is reflected to the output of the AGC unit 6 of the preceding stage. The change in the optical power of the optical signal at the input end 2 is suppressed according to the operation of the ALC unit 8. The optical signal, the optical power of which is suppressed, is amplified by a predetermined gain by the AGC unit 10 of the subsequent stage.

According to the structure of the optical amplifier shown in FIG. 1, the ALC unit 8 is provided independently, and for this reason, it is difficult to cope with a change in the number of WDM channels, as described above. On the other hand, the present invention makes it possible to easily cope with the change in the number of WDM channels, by combining AGC units so as to substantially realize ALC functions, as will be described hereunder.

Figure 3:
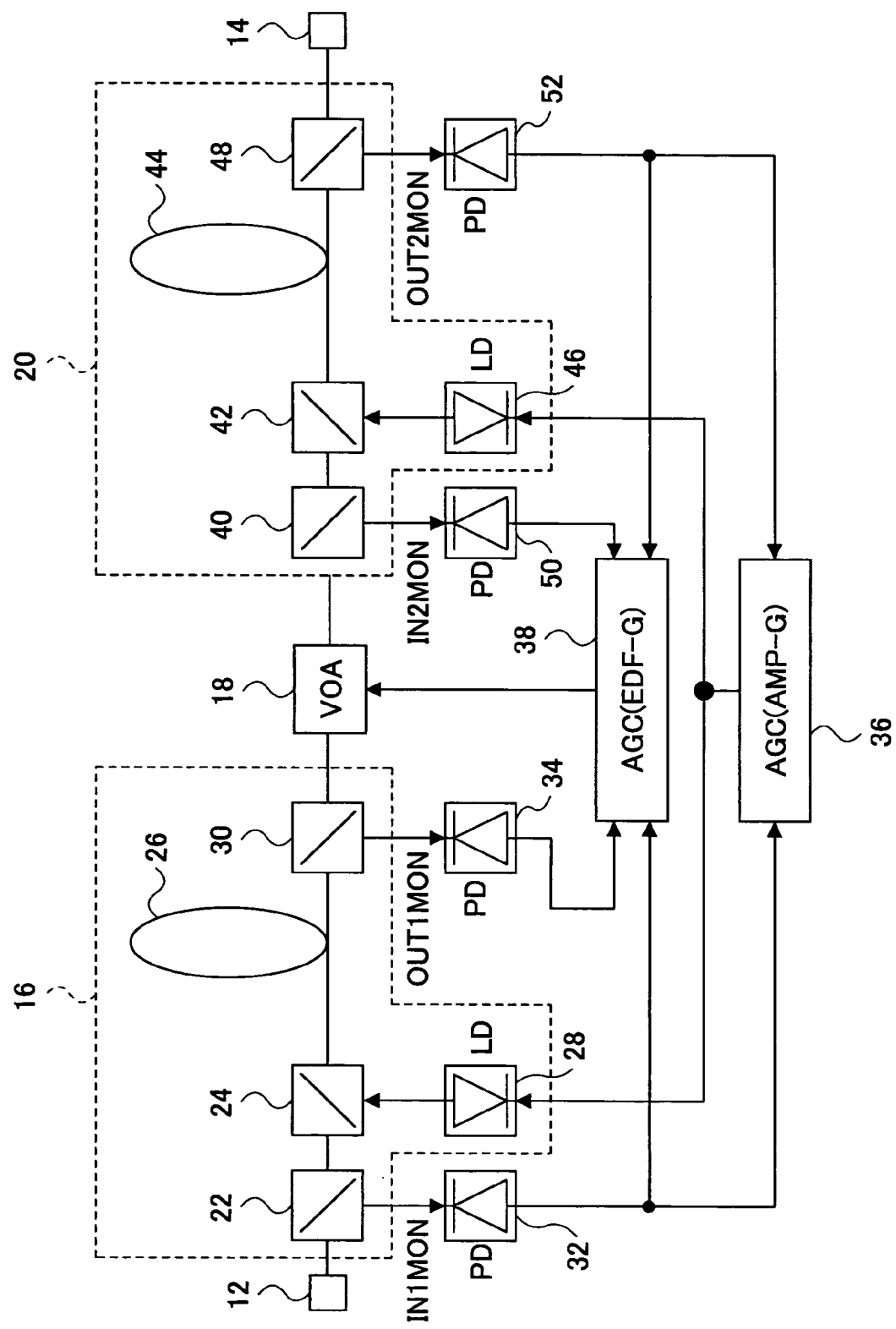
FIG. 3 is a system block diagram showing a first embodiment of an optical amplifier according to the present invention.

FIG. 3 is a system block diagram showing a first embodiment of an optical amplifier according to the present invention. The optical amplifier shown in FIG. 3 includes a first optical amplifier unit 16, a Variable Optical Attenuator (VOA) 18 and a second optical amplifier unit 20 which are optically connected between an input end 12 and an output end 14 in a cascade connection.

An optical signal which is to be amplified and input to the input end 12, is supplied to the first optical amplifier unit 16. In the first optical amplifier unit 16, the optical signal is supplied to an EDF 26 via an optical coupler 22 and a WDM coupler 24. A pump light from a laser diode 27 is supplied to the EDF 26 via the WDM coupler 24. Hence, it is possible to obtain a gain which is dependent on a power of the pump light. The optical signal which is amplified in the EDF 26 is output from the first optical amplifier unit 16 via an optical coupler 30.

The optical amplifier shown in FIG. 3 is provided with photodetectors 32 and 34, in order to monitor the an input and an output of the first optical amplifier unit 16. The photodetector 32 converts an optical signal branched by the optical coupler 22 into an electrical signal. The photodetector 34 converts an optical signal branched by the optical coupler 30 into an electrical signal. The electrical signal from the photodetector 32 is supplied to an AGC circuit 36 which is provided as a first control unit. Further, the electrical signals from the photodetectors 32 and 34 are supplied to an AGC circuit 38 which is provided as a second control unit.

The optical signal which is amplified by the first optical amplifier unit 16 is attenuated by the variable optical attenuator 18, and then supplied to the second optical amplifier unit 20. In the second optical amplifier unit 20, the optical signal is supplied to an EDF 44 via an optical coupler 40 and a WDM coupler 42. Thus, it is possible to obtain a gain which is dependent on the power of the pump light. The optical signal which is amplified in the EDF 44 is output via an optical coupler 48 and the output end 14.

The optical amplifier shown in FIG. 3 is provided with photodetectors 50 and 52, in order to monitor an input and an output of the second optical amplifier unit 20. The photodetector 50 converts an optical signal which is branched by the optical coupler 40 into an electrical signal. The photodetector 52 converts an optical signal which is branched by the optical coupler 48 into an electrical signal. The electrical signal from the photodetector 52 is supplied to the AGC circuit 36. In addition, the electrical signals from the photodetectors 50 and 52 are supplied to the AGC circuit 38.

A control signal from the AGC circuit 36 is supplied to the laser diodes 28 and 46 which form pump light sources. Hence, a total gain of a total portion from the input end 12 to the output end 14 is controlled to a target value. Moreover, the AGC circuit 38 controls the attenuation of the variable optical attenuator 18 so that a sum of a gain of the first optical amplifier unit 16 and a gain of the second optical amplifier unit 20 becomes constant.

Figure 4:
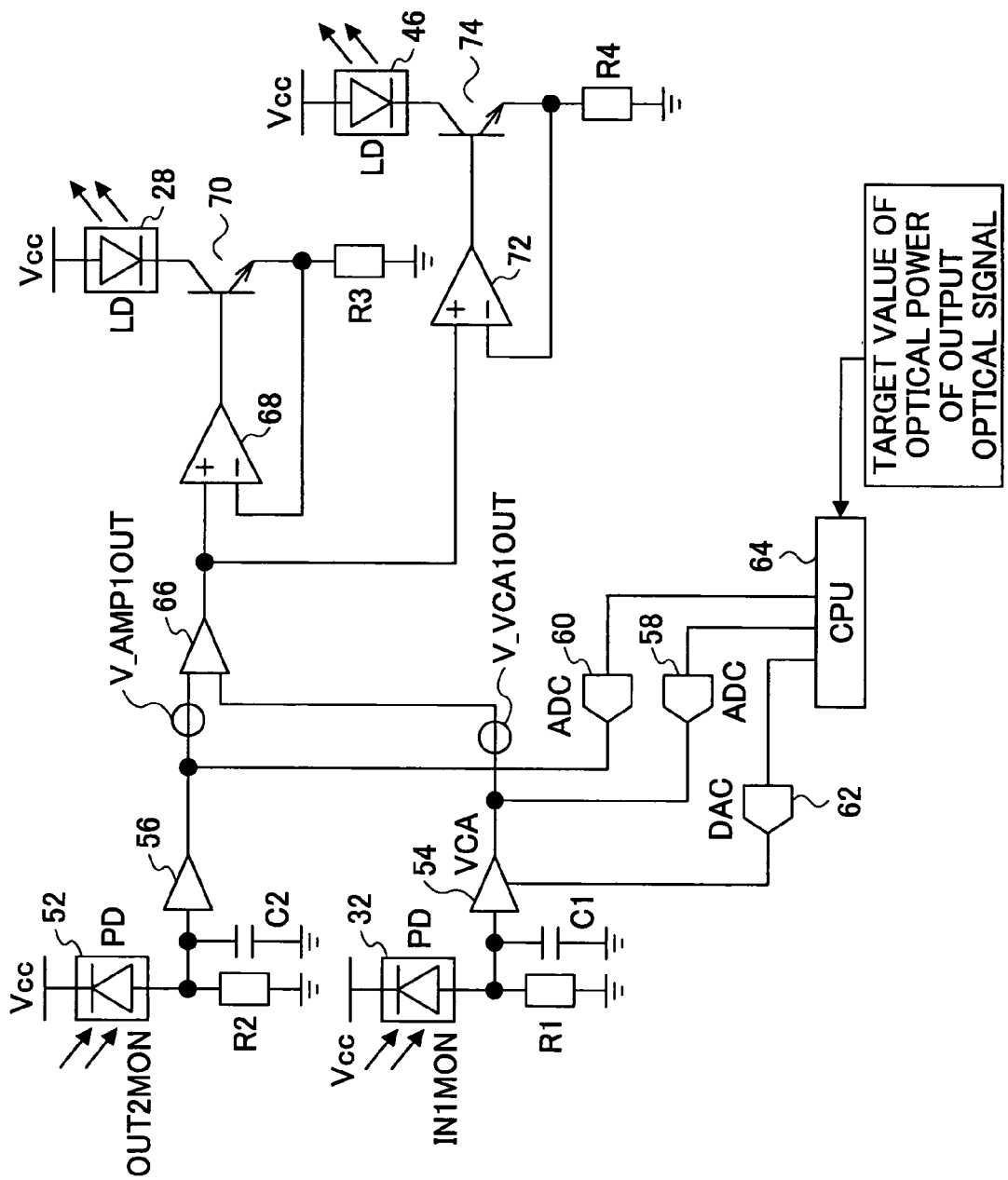
FIG. 4 is a diagram showing a first embodiment of an AGC circuit which controls gains of first and second optical amplifier units.

Next, a description will be given of a structure of the AGC circuit 36, by referring to FIG. 4. FIG. 4 is a diagram showing a first embodiment of the AGC circuit which controls gains of first and second optical amplifier units, that is, the AGC circuit 36 which controls the gains of the first and second optical amplifier units 16 and 20. In FIG. 4, the photodetector 32 and a resistor R1 are connected in series between a power supply line Vcc and ground. A reverse bias is applied to the photodetector 32, and a photocurrent which is dependent on the input of the first optical amplifier unit 16 flows through the photodetector 32 and the resistor R1.

Accordingly, a potential at a node connecting the photodetector 32 and the resistor R1 may be obtained as a voltage signal dependent on the input to the first optical amplifier unit 16. In order to eliminate a signal component and obtain an average level of the input to the first optical amplifier unit 16, a capacitor C1 is connected in parallel to the resistor R1.

Similarly, the photodetector 52 and a resistor R2 are connected in series between the power supply line Vcc and the ground. A reverse bias is applied to the photodetector 52, and a photocurrent which is dependent on the output of the second optical amplifier unit 20 flows through the photodetector 52 and the resistor R2.

Hence, a potential at a node connecting the photodetector 52 and the resistor R2 may be obtained as a voltage signal dependent on the output of the second optical amplifier unit 20. In order to eliminate a signal component and obtain an average level of the output of the second optical amplifier unit 20, a capacitor C2 is connected in parallel to the resistor R2.

The voltage signal from the photodetector 32 is amplified in a voltage controlled amplifier (VCA) 54 by a gain which is voltage-controlled, and supplied to one input port of a differential amplifier 66. In addition, the voltage signal from the photodetector 52 is amplified in an amplifier 56 by a gain which is fixed, and supplied to the other input port of the differential amplifier 66.

The outputs of the VCA 54 and the amplifier 56 are converted into digital signals by corresponding analog-to-digital converters (ADCs) 58 and 60, and supplied to a CPU (or microcontroller) 64. A digital signal which is carried out as a result of an operation within the CPU 64 is converted into a voltage signal by a digital-to-analog converter (DAC) 62. The gain of the VCA 54 is adjusted based on the voltage signal from the DAC 62.

An amplifier 68, a transistor 70 and a resistor R3 are provided in order to drive the laser diode 28 which forms the pump light source. In addition, an amplifier 72, a transistor 74 and a resistor R4 are provided in order to drive the laser diode 46 which forms the pump light source. The laser diodes 28 and 46 are driven and controlled based on an output of the differential amplifier 66.

Resistances of the resistors R1 and R2 and gains of the VCA 54 and the amplifier 56 are set so as to satisfy the following relationship, where V_AMP1OUT denotes an output level of the amplifier 56 and V_VCA1OUT denotes an output level of the VCA 54. In other words, when the optical power of the input optical signal of the optical amplifier is denoted by x [dB], the optical power of the output optical signal of the optical amplifier is denoted by x+A [dB], and the gain of the optical amplifier is denoted by A [dB], the output levels V_AMP1OUT and V_VCA1OUT of the amplifier 56 and the VCA 54 are set to match and become equal to y [V]. This means that the photodetectors 32 and 52 have light receiving sensitivities [V/W] having a ratio $10^{(AMP\_G/10)}$, where AMP_G denotes the gain of the entire optical amplifier.

Since the gain A [dB] is constant in the above described relationship, if the optical power of the input optical signal per wavelength channel varies, the optical power of the output optical signal also varies therewith. Hence, an operation is carried out in the CPU 64 so that the optical power of the output optical signal becomes the target value and constant, and the gain of the VCA 54 is adjusted depending on the operation result.

Therefore, this embodiment can substantially carry out the ALC by controlling the gains of the first and second optical amplifier units 16 and 20. Consequently, compared to the conventional case where the ALC is carried out by use of the variable optical attenuator, it becomes unnecessary to carry out a troublesome switching operation when the number of operating channels is changed or the like.

Figure 5:
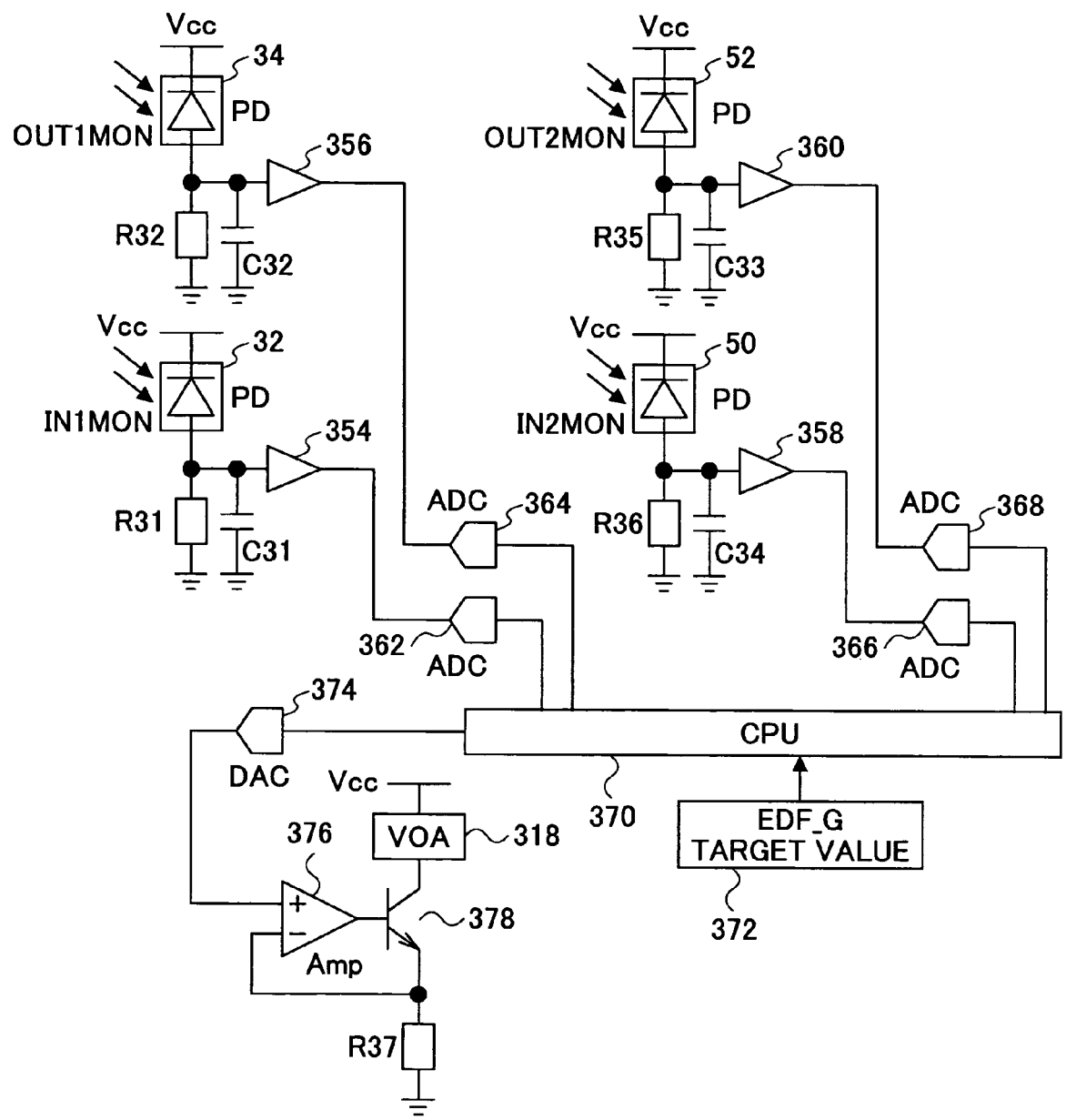
FIG. 5 is a diagram showing a first embodiment of an AGC circuit which controls an attenuation of a variable optical attenuator.

Next, a description will be given of a structure of the AGC circuit 38, by referring to FIG. 5. FIG. 5 is a diagram showing a first embodiment of the AGC circuit 38 which controls the attenuation of the variable optical attenuator 18. In FIG. 5, R31, R32, R35, R36 and R37 denote resistors, and C31, C32, C33 and C34 denote capacitors. In order to monitor the input and the output of the first optical amplifier unit 16, the voltage signals from the photodetectors 32 and 34 are amplified by corresponding amplifiers 354 and 356 having fixed gains, and supplied to corresponding ADCs 362 and 364. The ADCs 362 and 364 convert the voltage signals from the corresponding photodetectors 332 and 334 into digital signals, and supply the digital signals to a CPU (or microcontroller) 370.

In order to monitor the input and the output of the second optical amplifier unit 20, voltage signals from the photodetectors 350 and 352 are amplified by corresponding amplifiers 358 and 360 having fixed gains, and supplied to corresponding ADCs 366 and 368. The ADCs 366 and 368 convert the voltage signals from the corresponding photodetectors 350 and 352 into digital signals, and supply the digital signals to the CPU 370.

The CPU 370 calculates a condition in which a sum of the gain of the first optical amplifier unit 16 and the gain of the second optical amplifier unit 20 becomes constant. More particularly, the CPU 370 calculates the condition of the attenuation of the variable optical attenuator 18. The calculation result of the CPU 370 is converted into a voltage signal by a DAC 374, and supplied to a driving circuit of the variable optical attenuator 18, including an amplifier 376, a transistor 378 and the resistor R37.

Next, a description will be given of the control and effects of the variable optical attenuator 18.

When only the control by the AGC circuit 36 shown in FIG. 4 is carried out, it is impossible to maintain the wavelength characteristic of the gain constant in the wavelength band of the WDM optical signal, and there is a possibility that the transmission characteristic will deteriorate due to the generation of a gain tilt. In a structure in which a plurality of optical amplifier units are connected in a cascade connection, the gain of each optical amplifier needs to be controlled constant in order to maintain the wavelength characteristic of the gain constant. But instead, it is possible to control the gains of the plurality of optical amplifier units so that a sum of the gains becomes constant.

If a real gain of the first optical amplifier unit 16 is denoted by G_A' [dB], a real gain of the second optical amplifier unit 20 is denoted by G_B' [dB], a target gain of the first optical amplifier unit 16 is denoted by G_A [dB], and a target gain of the second optical amplifier unit 20 is denoted by G_B [dB], a basic control is to make G_A'=G_A and G_B'=G_B.

For example, if the gain of the first optical amplifier unit 16 decreases by ΔG [dB], the conventional method controls the gain of the second optical amplifier unit 20 to increase by ΔG [dB]. Hence, G_A'+G_B'=G_A+G_B is substantially satisfied, and the wavelength characteristic of the gain of the entire optical amplifier is maintained constant.

However, the AGC circuit 36 becomes necessary in each of the first and second optical amplifier units 16 and 20. Further, it is necessary to provide a function of exchanging the gain ΔG between the first and second optical amplifier units 16 and 20. As a result, it is difficult to carry out a high-speed AGC.

On the other hand, such problems do not occur in this embodiment, because the variable optical attenuator 18 carries out a control so that the sum of the gains becomes constant. First, the CPU 70 calculates a gain sum EDF_G' of the gains of the first and second optical amplifier units 16 and 20 according to the following formula, where IN1MON, OUT1MON, IN2MON and OUT2MON respectively denote monitored values of the optical powers of the photodetectors 32, 34, 50 and 52.

$$EDF\_G' = G\_A' + G\_B'$$
$$= (OUT1MON - IN1MON) +$$
$$(OUT2MON - IN2MON)$$

In addition, the gain sum EDF_G' and a target value EDF_G thereof are compared, and the attenuation of the variable optical attenuator 18 is controlled according to the following formula, so that an error between the gain sum EDF_G' and the target value EDF_G becomes zero, where AMP_G denotes the gain of the entire optical amplifier, and VOA_L denotes the attenuation of the variable optical attenuator 18.

$$EDF\_G' = (OUT2MON - IN1MON) + (OUT1MON - IN2MON)$$
$$= AMP\_G + VOA\_L$$

Accordingly, by controlling the attenuation of the variable optical attenuator 18 so as to become VOA_L=EDF_G'−AMP_G, it is possible to easily control the gain of the entire optical amplifier so that the gain is maintained constant.

Figure 6:
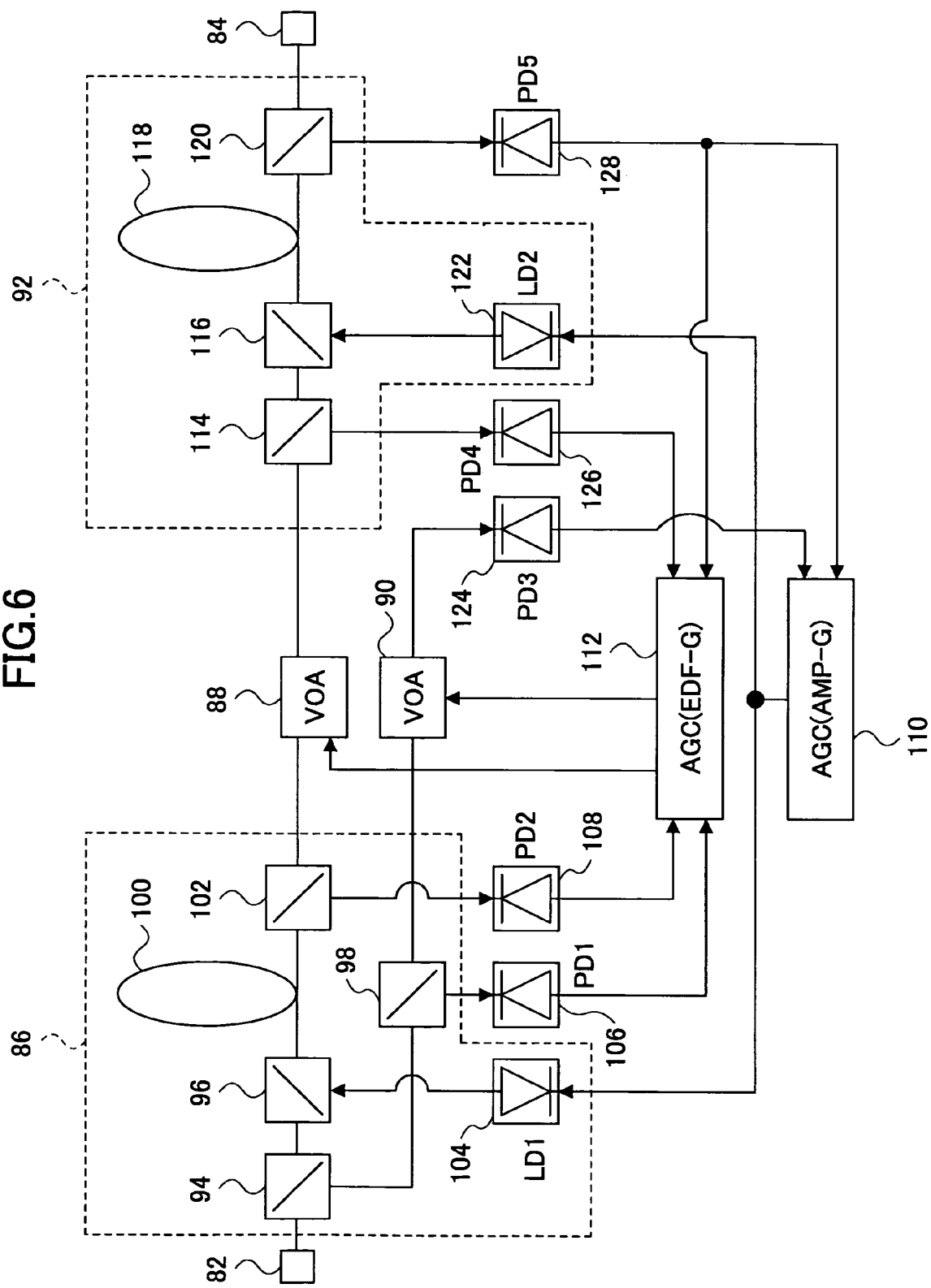
FIG. 6 is a system block diagram showing a second embodiment of the optical amplifier according to the present invention.

FIG. 6 is a system block diagram showing a second embodiment of the optical amplifier according to the present invention. The optical amplifier shown in FIG. 6 includes a first optical amplifier unit 86, a first variable optical attenuator (VOA) 88 and a second optical amplifier unit 92 which are optically connected between an input end 82 and an output end 84 in a cascade connection.

An optical signal which is to be amplified and input to the input end 82, is supplied to the first optical amplifier unit 86. In the first optical amplifier unit 86, the optical signal is supplied to an EDF 100 via an optical coupler 94 and a WDM coupler 96. A pump light from a laser diode 104 is supplied to the EDF 100 via the WDM coupler 96. Hence, it is possible to obtain a gain which is dependent on a power of the pump light. The optical signal which is amplified in the EDF 100 is output from the first optical amplifier unit 86 via an optical coupler 102. In addition, an optical signal branched in the optical coupler 94 is output from the first optical amplifier unit 86 via an optical coupler 98.

The optical amplifier shown in FIG. 3 is provided with photodetectors 106 and 108, in order to monitor the an input and an output of the first optical amplifier unit 86. The photodetector 106 converts the optical signal branched by the optical coupler 98 into an electrical signal. The photodetector 108 converts an optical signal branched by the optical coupler 102 into an electrical signal. The electrical signals from the photodetectors 106 and 108 are supplied to an AGC circuit 112 which is provided as a second control unit.

The optical signal which is amplified by the first optical amplifier unit 86 is attenuated by the first variable optical attenuator 88, and then supplied to the second optical amplifier unit 92. In addition, the optical signal which is branched by the optical coupler 94 is supplied to a second variable optical attenuator (VOA) 90 via the optical coupler 98, and attenuated. A photodetector 124 is provided in the optical amplifier, in order to monitor the optical signal which is attenuated by the second variable optical attenuator 90.

The photodetector 124 converts the optical signal which is attenuated by the second variable optical attenuator 90 into an electrical signal. The electrical signal from the photodetector 124 is supplied to an AGC circuit 110 which is provided as a first control unit.

The optical signal supplied to the second optical amplifier unit 92 is supplied to an EDF 118 via an optical coupler 114 and a WDM coupler 116. A pump light from a laser diode 122 is supplied to the EDF 118 via the WDM coupler 116. Hence, it is possible to obtain a gain which is dependent on the power of the pump light. The optical signal which is amplified by the EDF 118 is output via an optical coupler 120 and the output end 84.

The optical amplifier is provided with photodetectors 126 and 128 in order to monitor an input and an output of the second optical amplifier unit 92. The photodetector 126 converts an optical signal which is branched by the optical coupler 114 into an electrical signal. The photodetector 128 converts an optical signal branched by the optical coupler 120 into an electrical signal. The electrical signal from the photodetector 126 is supplied to the AGC circuit 112, and the electrical signal from the photodetector 128 is supplied to the AGC circuits 110 and 112.

A control signal from the AGC circuit 110 is supplied to the laser diodes 104 and 122 which form pump light sources. Hence, a total gain of a total portion from the input end 82 to the output end 84 is controlled to a target value.

Furthermore, the AGC circuit 112 controls the attenuation of the first variable optical attenuator 88 so that a sum of the gains of the first and second optical amplifier units 86 and 92 becomes constant. The optical amplifier shown in FIG. 6 is thus formed by a control circuit section made up of the AGC circuits 110 and 112, and an optical circuit section made up of circuit portions other than the control circuit section.

In the optical amplifier shown in FIG. 6, a total gain Amp_Gain of the entire optical amplifier, an EDF gain EDF_total_Gain which is a sum of the gains of the first and second optical amplifier units 86 and 92, an attenuation quantity VOA1_Loss of the first variable optical attenuator 88, and an attenuation quantity VOA2_Loss of the second variable optical attenuator 90 are controlled, using the electrical signal (hereinafter referred to as a monitored value PD1) from the photodetector 106, the electrical signal (hereinafter referred to as a monitored value PD2) from the photodetector 108, the electrical signal (hereinafter referred to as a monitored value PD3) from the photodetector 124, the electrical signal (hereinafter referred to as a monitored value PD4) from the photodetector 126 and the electrical signal (hereinafter referred to as a monitored value PD5) from the photodetector 128.

The monitored value PD1 is obtained by monitoring the input optical signal. The monitored value PD2 is obtained by monitoring the optical signal which is amplified by the first optical amplifier unit 86. The monitored signal PD3 is obtained by monitoring the optical signal which is attenuated by the second variable optical attenuator 90. The monitored value PD4 is obtained by monitoring the optical signal which is attenuated by the first variable optical attenuator 88. The monitored value PD5 is obtained by monitoring the optical signal which is amplified by the second optical amplifier unit 92.

The total gain Amp_Gain of the entire optical amplifier, the EDF gain EDF_total_Gain, the attenuation quantity VOA1_Loss of the first variable optical attenuator 88, and the attenuation quantity VOA2_Loss of the second variable optical attenuator 90 may be obtained from the following formulas using the monitored values PD1 through PD5.

$$Amp\_Gain = PD5 - PD1$$

$$VOA1\_Loss = PD2 - PD4$$

$$VOA2\_Loss = PD1 - PD3$$

$$\begin{aligned}EDF\_total\_Gain &= (PD5 - PD4) + (PD2 - PD1) \\ &= (PD5 - PD1) + (PD2 - PD4) \\ &= Amp\_Gain + VOA1\_Loss\end{aligned}$$

Therefore, in the optical amplifier shown in FIG. 6, the attenuation quantity VOA1_Loss of the first variable optical attenuator 88 and the total gain Amp_Gain of the entire optical amplifier are controlled during a normal operation (AGC state).

Figure 7:
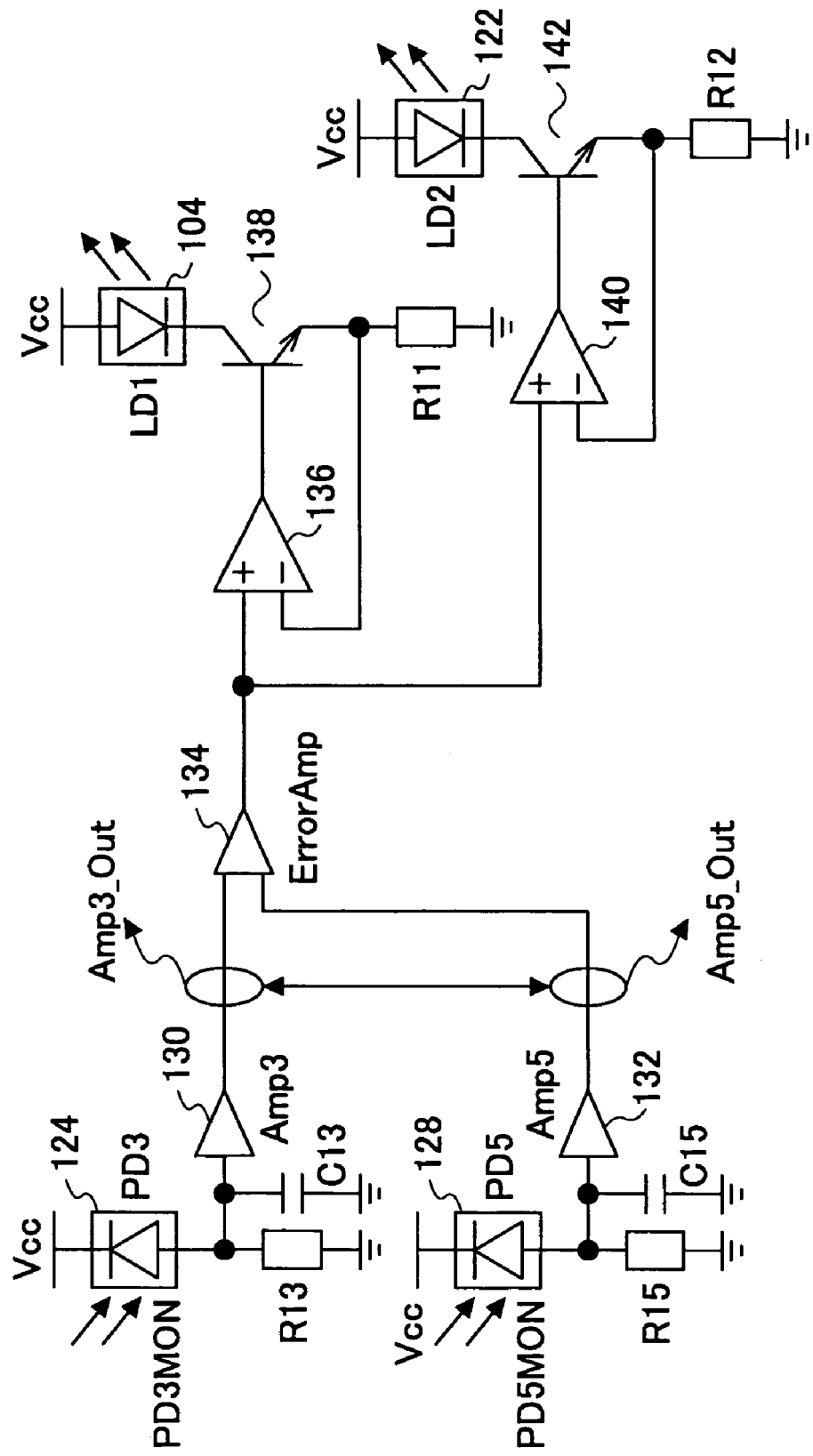
FIG. 7 is a diagram showing a second embodiment of the AGC circuit which controls the gains of first and second optical amplifier unit.

Next, a description will be given of a structure of the AGC circuit 110, by referring to FIG. 7. FIG. 7 is a diagram showing a second embodiment of the AGC circuit which controls the gains of the first and second optical amplifier units, that is, the AGC circuit 110 which controls the gains of the first and second optical amplifier units 86 and 92. The AGC circuit 110 drives the laser diodes 104 and 122 so that the total gain of the entire optical amplifier becomes a desired value, and thus, the total gain of the entire optical amplifier is controlled constant.

In the AGC circuit 110 shown in FIG. 7, the photodetector 124 and a resistor R13 are connected in series between the power supply line Vcc and the ground. A reverse bias is applied to the photodetector 124, and a photocurrent dependent on the output of the second variable optical attenuator 90 flows through the photodetector 124 and the resistor R13.

Accordingly, a potential at a node connecting the photodetector 124 and the resistor R13 may be obtained as a voltage signal dependent on the output of the second variable optical attenuator 90. In order to eliminate a signal component and obtain an average level of the output of the second variable optical attenuator 90, a capacitor C13 is connected in parallel to the resistor R13.

Similarly, the photodetector 128 and a resistor R15 are connected in series between the power supply line Vcc and the ground. A reverse bias is applied to the photodetector 128, and a photocurrent dependent on the output of the second optical amplifier unit 92 flows through the photodetector 128 and the resistor R15.

Hence, a potential at a node connecting the photodetector 128 and the resistor R15 maybe obtained as a voltage signal dependent on the output of the second optical amplifier unit 92. In order to eliminate a signal component and obtain an average level of the output of the second optical amplifier unit 92, a capacitor C15 is connected in parallel to the resistor R15.

The voltage signal from the photodetector 124 is subjected to an impedance conversion and amplification in an amplifier 130 having a fixed gain, and supplied to one input port of a differential amplifier 134. The voltage signal from the photodetector 128 is subjected to an impedance conversion and amplification in an amplifier 132 having a fixed gain, and supplied to the other input port of the differential amplifier 134.

The optical amplifier is provided with an amplifier 136, a transistor 138 and a resistor R11 in order to drive the laser diode 104 which forms the pump light source. In addition, the optical amplifier is provided with an amplifier 140, a transistor 142 and a resistor R12 in order to drive the laser diode 122 which forms a pump light source. These laser diodes 104 and 122 are driven and controlled based on an output of the differential amplifier 134.

If output levels of the amplifiers 130 and 132 are respectively denoted by Amp3_OUT and Amp5_OUT, the resistances of the resistors R13 and R15 and the gains of the amplifiers 130 and 132 are set to satisfy the following relationship. In other words, when the monitored value PD3 is denoted by x [dBm], and the monitored value PD5 denoted by x+Amp_Gain reference value [dBm], where Amp_Gain reference value denotes a reference value of the gain Amp_Gain of the entire optical amplifier, the output levels Amp3_OUT and Amp5_OUT of the amplifiers 130 and 132 are set to match and become equal to y [V], by setting monitoring circuits related to the photodetectors 124 and 128 to have light receiving sensitivities [V/W]. This means that the light receiving sensitivities [V/W] of the monitoring circuits related to the photodetectors 124 and 128 have a ratio $10^{(AMP\_G/10)}$, where AMP_G denotes gain of the entire optical amplifier.

The output of the differential amplifier 134 drives and controls the laser diodes 104 and 122 so that an error between the voltage signals supplied to the input ports of the differential amplifier 134 becomes zero. Therefore, in the optical amplifier shown in FIG. 6, it is possible to maintain the gain of the entire optical amplifier constant even when the wavelength changes.

However, since the Amp_Gain reference value of the entire optical amplifier is constant according to the above described relationship, if the optical power of the input optical signal varies per wavelength channel, the optical power of the output optical signal varies therewith. Hence, in the optical amplifier shown in FIG. 6, the ALC described later is used to compensate for and control the deviation of the input optical signal, so that the optical power of the output optical signal becomes a control target value which is constant.

In the optical amplifier, it is necessary to absorb an input dynamic range caused by inconsistencies in the transmission line loss, deterioration due to aging of the optical fiber transmission line and the like. This input dynamic range absorption is realized by the ALC. In the ALC state, information indicating the wavelength is notified from a monitoring control unit which is provided on an upstream side with respect to the optical amplifier, and this information is used to determine the output target value of the optical amplifier.

In the conventional optical amplifier, the variable optical attenuator is driven so that the signal output of the ALC unit 8 shown in FIG. 1 in the intermediate stage becomes the control target value, by controlling the attenuation quantity of the variable optical attenuator. This control target value may be calculated as follows, where Gc denotes an insufficient gain of the AGC unit 6 in the preceding stage.

(Control Target Value of ALC Unit)[dBm]=(Output Reference Value of ALC Unit)[dBm/ch]+10log(Wavelength)−Gc[dB]

The insufficient gain Gc may be calculated as follows.

Gc[dB]=(Gain Target Value of AGC Unit)[dB]−(Gain of AGC)[dB]

Therefore, the gain target value of the AGC unit 10 in the subsequent stage shown in FIG. 1 needs to be increased by Gc [dB]. From the point of view of obtaining desired NF and pumping (excitation) efficiency for the entire optical amplifier, the variable optical attenuator is located in the intermediate stage of the optical amplifier.

On the other hand, in this embodiment of the optical amplifier, the deviation of the input optical signal is not compensated by controlling the attenuation quantity of the first variable optical attenuator 88. As described above, the present invention controls the output optical signal to change by an amount of deviation of the input optical signal, by controlling the gain of the entire optical amplifier constant. Moreover, this embodiment maintains the attenuation quantity of the first variable optical attenuator 88 constant by the control of the AGC circuit 112, as described later.

In the case of an optical amplifier which controls the gains of the first and second optical amplifier units 86 and 92 by a single AGC circuit 110, if the input optical signal per wavelength channel deviates, the output optical signal varies therewith. For this reason, it is necessary to provide a circuit, a microcontroller or the like for compensating for the deviation of the input optical signal per wavelength channel. As a result, noise and response speed of the circuit, microcontroller or the like for compensating for the deviation of the input optical signal may adversely affect the control circuit section to deteriorate the characteristics of the optical amplifier.

But in this embodiment of the optical amplifier, the optical circuit section compensates for the deviation of the input optical signal, and it is unnecessary to compensate using the control circuit section, as described hereunder with reference to Processing Methods P1 and P2.

[Processing Method P1]

According to the processing method P1, a position information of the input optical signal within the input dynamic range is recognized based on the monitored value PD1. The attenuation quantity of the second variable optical attenuator 90 is controlled based on the recognized position information, so that the output signal level is controlled constant. The optical amplifier calculates the following values which are necessary for the control, using the information related to the wavelength notified from the monitoring control unit which is provided on the upstream side of the optical amplifier, where Ld denotes the attenuation quantity (dead loss) of the second variable optical attenuator 90 when the optical power of the input optical signal per wavelength channel is u [dBm/ch].

Monitored Value PD1: z1 [dBm]
Monitored Value PD3: z3 [dBm]
Information of Wavelength of Input Signal: N
Optical Power of Input Optical Signal: z1−10log(N) [dBm/ch]
Upper Limit Value of Optical Power of Input Optical Signal Per Wavelength Channel: u [dBm/ch]
Position Information Within Input Dynamic Range: L0=u−{z1−10log(N)}
Attenuation Quantity of Second Variable Optical Attenuator 90: L=z1 −z3 −Ld [dB]

The values z1−10log(N) [dBm/ch], L0=u−{z1−10log(N)}, and L=z1−z3−Ld [dB] may be calculated by a microcontroller or the like. In addition, the value u [dBm/ch] may be stored in a ROM, for example.

In this embodiment of the optical amplifier, the attenuation quantity L of the second variable optical attenuator 90 is controlled is controlled to becomes L=L0, by calculating the deviation (corresponding to L0) of the input optical signal per wavelength channel. By this process, the output value of the amplifier 130 will not change even when the optical power of the input optical signal per wavelength channel changes.

As a result, the optical power of the output optical signal from the optical amplifier is controlled constant and the ALC operation is realized, because the output value of the amplifier 132 is also controlled by the AGC circuit 110 so as not to change.

[Processing Method P2]

According to the processing method P2, the monitored value PD5 and the output signal reference value are compared, and the attenuation quantity of the second variable optical attenuator 90 is controlled so that an error between the compared values becomes zero. The optical amplifier calculates the following values which are necessary for the control, using the information related to the wavelength notified from the monitoring control unit which is provided on the upstream side of the optical amplifier.

Monitored Value PD5: z5 [dBm]
Information of Wavelength of Input Signal: N
Output Reference Value Per Wavelength Channel: A0 [dBm/ch]
Optical Power of Output Optical Signal: A=z5−10log(N) [dBm/ch]

The value A may be calculated by a microcontroller or the like, for example. The value A0 may be stored in a ROM, for example. In this embodiment of the optical amplifier, it is possible to control the optical power A of the output optical signal per wavelength channel by the attenuation quantity L of the second variable optical attenuator 90. Hence, the ALC operation can be realized by controlling the attenuation quantity L of the second variable optical attenuator 90 so that the optical power A of the output optical signal becomes A=A0. In this processing method P2, the attenuation quantity L of the second variable optical attenuator 90 is L=L0 as in the case of the processing method P1.

By controlling the gain of the entire optical amplifier constant and carrying out the ALC operation only, the signal gain characteristic cannot be maintained constant in the optical signal wavelength region due to the effects of the EDF gain tilt. For this reason, in this embodiment of the optical amplifier, the EDF gain is controlled constant in order to maintain the gain tilt characteristic constant.

Figure 8:
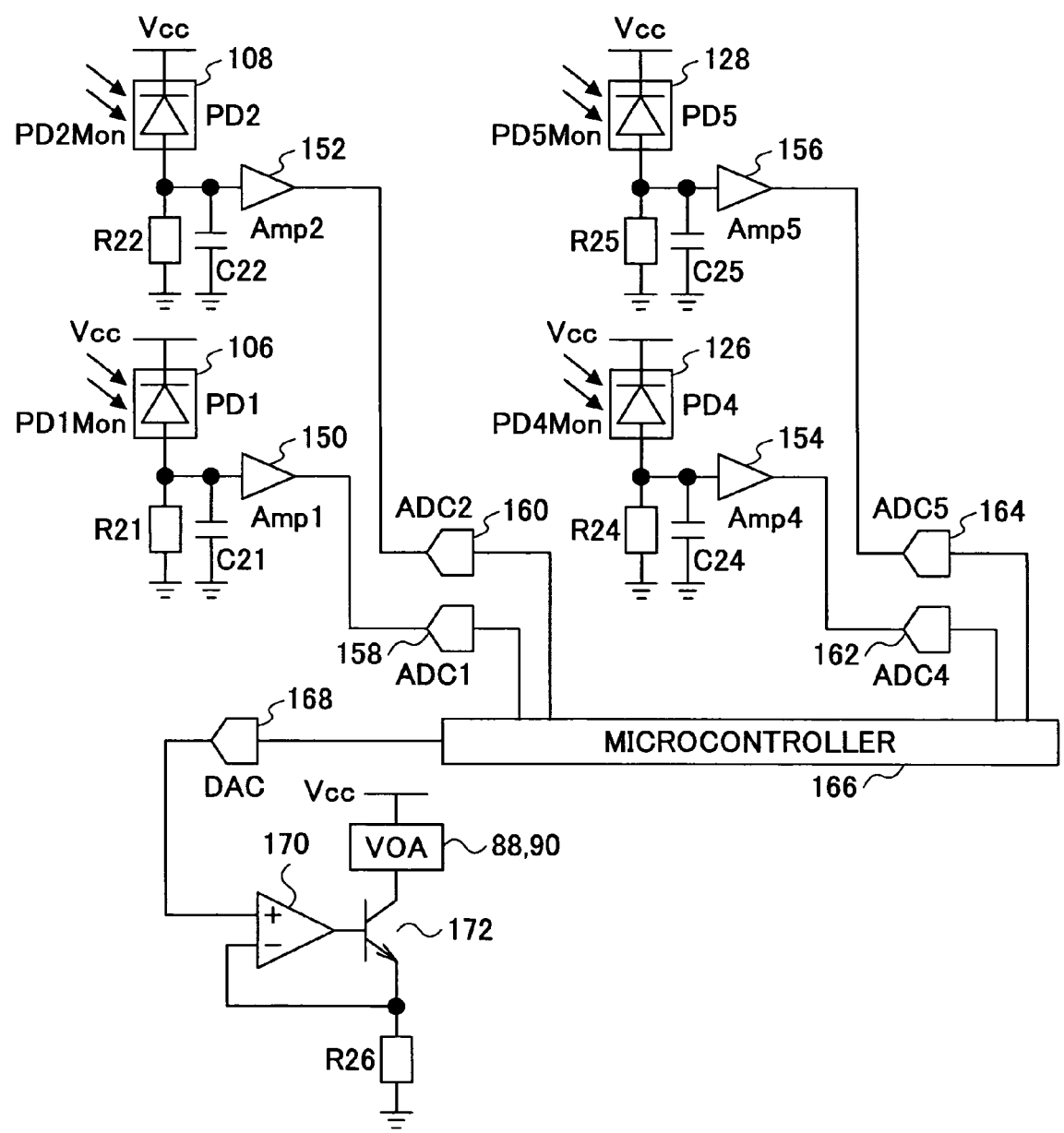
FIG. 8 is a diagram showing a second embodiment of the AGC circuit which controls the attenuation of a first variable optical attenuator.

Next, a description will be given of a structure of the AGC circuit 112, by referring to FIG. 8. FIG. 8 is a diagram showing a second embodiment of the AGC circuit 112 which controls the attenuation of the first variable optical attenuator 88. In FIG. 8, R21, R22, R24, R25 and R26 denote resistors, and C21, C22, C24 and C25 denote capacitors. In order to monitor the input and the output of the first optical amplifier unit 86, the voltage signals from the photodetectors 106 and 108 are amplified by corresponding amplifiers 150 and 152 having fixed gains, and supplied to corresponding ADCs 158 and 160. The ADCs 158 and 160 convert the voltage signals from the corresponding photodetectors 106 and 108 into digital signals, and supply the digital signals to a microcontroller (or CPU) 166.

In order to monitor the input and the output of the second optical amplifier unit 92, voltage signals from the photodetectors 126 and 128 are amplified by corresponding amplifiers 154 and 156 having fixed gains, and supplied to corresponding ADCs 162 and 164. The ADCs 162 and 164 convert the voltage signals from the corresponding photodetectors 126 and 128 into digital signals, and supply the digital signals to the microcontroller 166.

The microcontroller 166 calculates the EDF gain by adding the gain of the entire optical amplifier and the attenuation quantity of the first variable optical attenuator 88. Hence, by driving the first variable optical attenuator 88 so that the attenuation quantity thereof becomes a target value (VOA1_Loss target value) described by the following, the microcontroller 166 can control the EDF gain constant.

(VOA1_Loss Target Value)=(Gain of Entire Optical Amplifier)−(EDF Gain Target Value)

The microcontroller 166 calculates the target value of the attenuation quantity of the first variable optical attenuator 88, and controls the first variable optical attenuator 88 so that the attenuation quantity thereof becomes the target value. A control signal which is output from the microcontroller 166 so as to control the first variable optical attenuator 88 is converted into a voltage signal by a DAC 168, and is supplied to a driving circuit for the first variable optical attenuator 88. This driving circuit includes an amplifier 170, a transistor 172 and the resistor R26.

Figure 9:
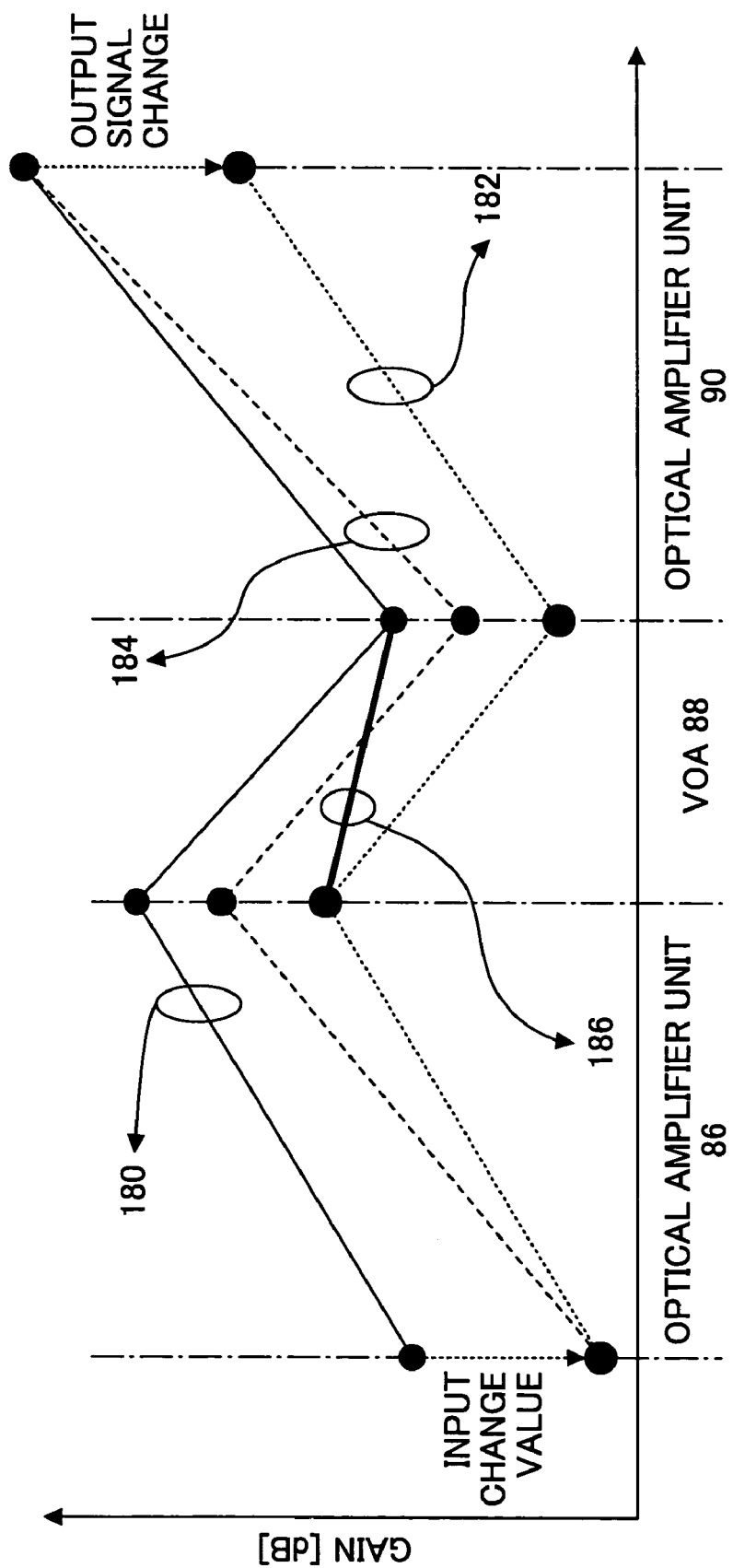
FIG. 9 is a diagram for explaining an operation of the optical amplifier shown in FIG. 6.

Next, a description will be given of the operation of the optical amplifier shown in FIG. 6, by referring to FIGS. 9 and 10. FIG. 9 is a diagram for explaining the operation of the optical amplifier, and FIG. 10 is a table showing each monitored values of the optical amplifier and changes in attenuation quantities of the first and second variable optical attenuators 88 and 90.

In FIG. 9, a graph 180 shows an initial setting control state where initial values are set so that the monitored values PD1 and PD3 have the same value when the input has the upper limit (or a level other than the upper limit). The attenuation quantity of the first variable optical attenuator 88 is set to the initial value stored in the ROM, for example.

A graph 182 shows an input change control state where a change is introduced in the input signal. The graph 182 changes so that the signal power is smaller than that of the graph 180.

A graph 184 shows a change correcting control state where the amount of change of the input signal is calculated and the attenuation quantity of the second variable optical attenuator 90 is controlled so as to correct the amount of change. The amount of change of the input signal per wavelength channel is corrected by controlling the attenuation quantity of the second variable optical attenuator 90. In addition, a graph 186 shows a state where gain of the entire optical amplifier is controlled constant by the AGC using the monitored values PD3 and PD5, and the attenuation quantity of the first variable optical attenuator 88 is controlled so as to maintain the EDF gain target value.

In FIG. 10, "X" indicates an input signal power, and "α" indicates an amount of change. Further, "L1" indicates the attenuation quantity of the first variable optical attenuator 88, "L2" indicates the attenuation quantity of the second variable optical attenuator 90, and "A" indicates the gain of the entire optical amplifier.

In this embodiment, the first and second variable optical attenuators 88 and 90 are controlled independently. However, when the input signal level changes by X [dB] per wavelength channel, the attenuation quantities of the first and second variable optical attenuators 88 and 90 respectively become X [dB]. Hence, a description will now be given of a case where processes similar to those carried out by the second embodiment of the optical amplifier having the first and second variable optical attenuators 88 and 90 are carried out in an optical amplifier having a single variable optical attenuator.

Figure 11:
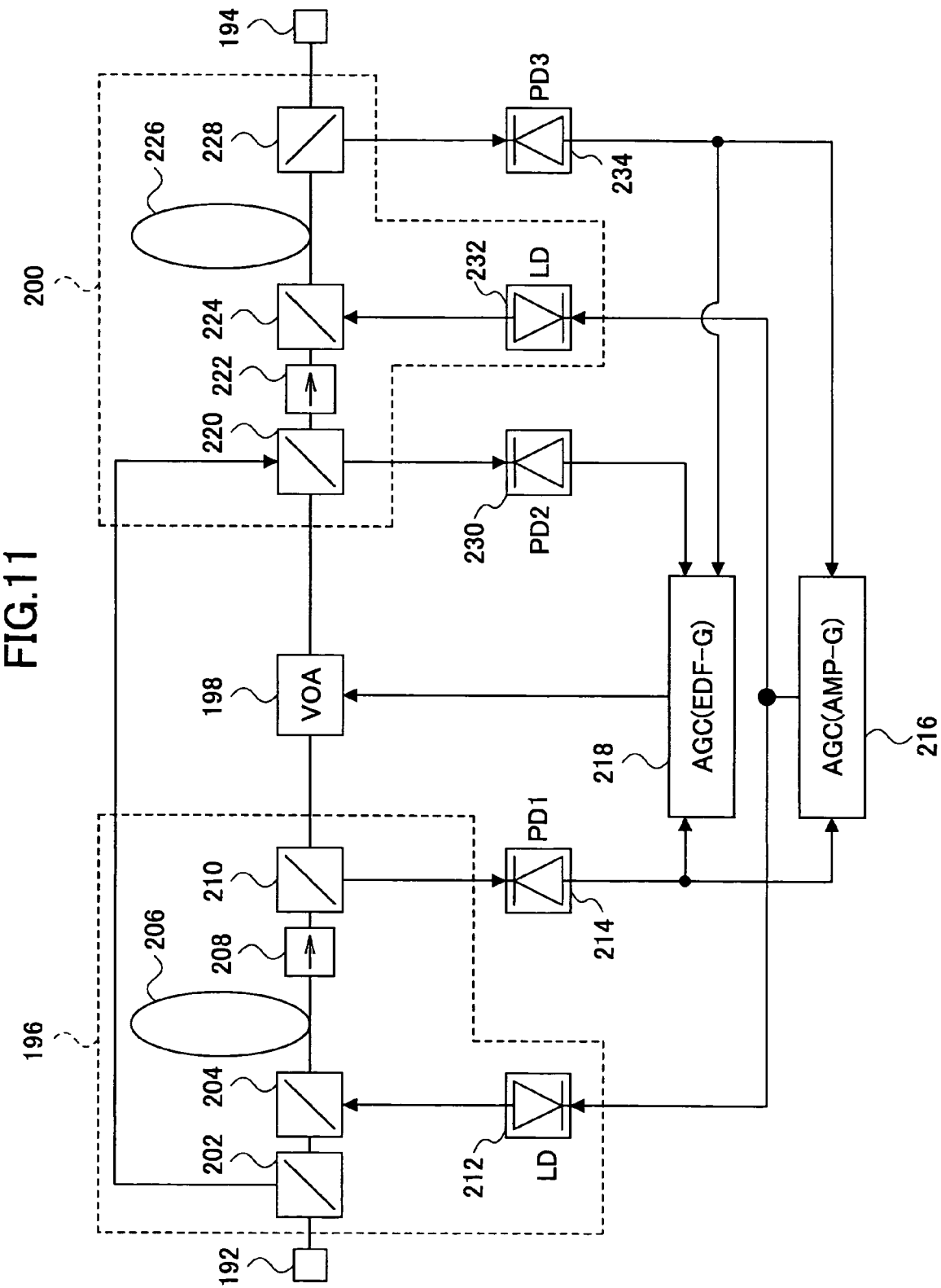
FIG. 11 is a system block diagram showing a third embodiment of the optical amplifier according to the present invention.

FIG. 11 is a system block diagram showing a third embodiment of the optical amplifier according to the present invention. The optical amplifier shown in FIG. 11 includes a first optical amplifier unit 196, a variable optical attenuator (VOA) 198 and a second optical amplifier unit 200 which are optically connected in a cascade connection between an input end 192 and an output end 194.

An optical signal which is to be amplified and input to the input end 192, is supplied to the first optical amplifier unit 196. In the first optical amplifier unit 196, the optical signal is supplied to an EDF 206 via an optical coupler 202 and a WDM coupler 204. A pump light from a laser diode 212 is supplied to the EDF 206 via the WDM coupler 204. Hence, it is possible to obtain a gain which is dependent on a power of the pump light. The optical signal which is amplified in the EDF 206 is output from the first optical amplifier unit 196 via an isolator 208 and an optical coupler 210. In addition, a first branch optical signal branched in the optical coupler 202 is output as it is from the first optical amplifier unit 196.

The optical signal amplified by the first optical amplifier unit 196 is attenuated in the variable optical attenuator 198 and then supplied to the second optical amplifier unit 200. In the second optical amplifier unit 200, the optical signal is supplied to an EDF 226 via an optical coupler 220, an isolator 222 and a WDM coupler 224. A pump light from a laser diode 232 is supplied to the EDF 226 via the WDM coupler 224. Thus, it is possible to obtain a gain which is dependent on the power of the pump light. The optical signal amplified in the EDF 226 is output via an optical coupler 228 and the output end 194.

The first branch optical signal output from the first optical amplifier unit 196 is supplied to the optical coupler 220 of the second optical amplifier unit 200, and branched into second and third branch optical signals. The third branch optical signal is attenuated in the variable optical attenuator 198 and then supplied to the optical coupler 210. The third branch optical signal supplied to the optical coupler 210 is branched into a fourth branch optical signal.

The optical amplifier shown in FIG. 11 is provided with a photodetector 230, in order to monitor the an input and an output of the first optical amplifier unit 196. The photodetector 230 converts the second branch optical signal branched by the optical coupler 220 into an electrical signal.

The optical amplifier is also provided with a photodetector 214, in order to monitor the optical signal which reflects the attenuation in the variable optical attenuator 198 to the input of the first optical amplifier unit 196. The photodetector 214 converts the fourth branch optical signal branched by the optical coupler 210 into an electrical signal.

The optical amplifier is further provided with a photodetector 234, in order to monitor the output of the second optical amplifier unit 200. The photodetector 234 converts the fifth branch optical signal branched by the optical coupler 228 into an electrical signal.

The electrical signal from the photodetector 230 is supplied to an AGC circuit 218 which forms a second control unit. In addition, the electrical signals from the photodetectors 214 and 234 are supplied to the AGC circuit 218 and an AGC circuit 216 which forms a first control unit.

A control signal from the AGC circuit 216 is supplied to the laser diodes 212 and 232 which form pump light sources. Hence, a total gain of a total section from the input end 192 to the output end 194 is controlled to a target value.

Furthermore, the AGC circuit 218 controls the attenuation of the variable optical attenuator 198 so that a sum of the gains of the first and second optical amplifier units 196 and 200 becomes constant. The optical amplifier shown in FIG. 11 is thus formed by a control circuit section made up of the AGC circuits 216 and 218, and an optical circuit section made up of circuit portions other than the control circuit section.

In the optical amplifier shown in FIG. 11, the gain of the entire optical amplifier, the EDF gain and the attenuation quantity of the variable optical attenuator 198 are controlled, using the electrical signal (monitored value PD1) from the photodetector 214, the electrical signal (monitored value PD2) from the photodetector 230, and the electrical signal (monitored value PD3) from the photodetector 234.

The isolator 208 prevents the fourth branch optical signal from entering the EDF 206. The isolator 222 prevents an output Back_ASE of the EDF 226 from entering the photodetectors 214 and 230.

The gain Amp_Gain of the entire optical amplifier, the EDF gain EDF_total_Gain, and the attenuation quantity VOA_Loss of the variable optical attenuator 198 may be obtained from the monitored values PD1 through PD3 as follows.

$$Amp\_Gain = PD3 - PD2$$

$$VOA\_Loss = PD2 - PD1$$

$$\begin{aligned} EDF\_total\_Gain &= Amp\_Gain + VOA\_Loss \\ &= (PD3 - PD2) + (PD2 - PD1) \\ &= (PD3 - PD1) \end{aligned}$$

Accordingly, as may be seen from the above relationship, the gain Amp_Gain of the entire optical amplifier and the attenuation quantity VOA_Loss of the variable optical attenuator 198 are controlled during the normal operation (AGC state) of the optical amplifier shown in FIG. 11.

Next, a description will be given of a process carried out by the AGC circuit 216. Since the AGC circuit 216 drives the laser diodes 212 and 232 so that the gain of the entire optical amplifier becomes a desired value, the gain of the entire optical amplifier is controlled constant. The structure of the AGC circuit 216 may be the same as the structure of the AGC circuit 110 described above.

The gain of the entire optical amplifier may be controlled constant, similarly to the second embodiment described above, by controlling the outputs of the laser diodes 212 and 232 so that the gain of the entire optical amplifier calculated from the monitored values PD1 and PD2 becomes the desired value. In actual practice, the gain of the entire optical amplifier is controlled constant based on the monitored values PD1 and PD3 so that the following set conditions are satisfied.

In other words, when the monitored values PD1 and PD3 are respectively denoted by x [dBm] and x+Amp_Gain reference value [dBm], monitoring circuits related to the photodetectors 214 and 234 are set to have light receiving sensitivities [V/W], so that the output levels of the amplifiers 130 and 132 match and become equal to y [V].

An output of a differential amplifier of the AGC circuit 216, corresponding to the differential amplifier 134 of the AGC circuit 110 shown in FIG. 7, drives and controls the laser diodes 212 and 232 so that an error between the voltage signals supplied to the input ports of the differential amplifier becomes zero. Therefore, in the optical amplifier shown in FIG. 11, it is possible to maintain the gain of the entire optical amplifier constant even when the wavelength changes.

In the optical amplifier shown in FIG. 11, it is also necessary to cope with the deviation of the optical power of the input optical signal per wavelength channel, and the deviation of the optical power of the input optical signal is compensated by using the ALC. In the ALC state, information indicating the wavelength is notified from a monitoring control unit which is provided on an upstream side with respect to the optical amplifier, and this information may be used to determine the output target value of the optical amplifier, similarly to the second embodiment of the optical amplifier described above.

[Processing Method P3]

According to the processing method P3, a position information of the input optical signal within the input dynamic range is recognized based on the monitored value PD2. The attenuation quantity of the variable optical attenuator 198 is controlled based on the recognized position information, so that the output signal level is controlled constant. The optical amplifier calculates the following values which are necessary for the control, using the information related to the wavelength notified from the monitoring control unit which is provided on the upstream side of the optical amplifier, where Ld denotes the attenuation quantity (dead loss) of the variable optical attenuator 198 when the optical power of the input optical signal per wavelength channel is u [dBm/ch].

Monitored Value PD1: z1 [dBm]
Monitored Value PD2: z2 [dBm]
Information of Wavelength of Input Signal: N
Optical Power of Input Optical Signal: z2−10log(N) [dBm/ch]
Upper Limit Value of Optical Power of Input Optical Signal Per Wavelength Channel: u [dBm/ch]
Position Information Within Input Dynamic Range: L0=u−{z2−10log(N)}
Attenuation Quantity of Second Variable Optical Attenuator 90: L=z2−z1−Ld [dB]

The values z2−10log(N) [dBm/ch], L0=u−{z2−10log(N)}, and L=z2−z1−Ld [dB] may be calculated by a microcontroller or the like. In addition, the value u [dBm/ch] may be stored in a ROM, for example.

In this embodiment of the optical amplifier, the attenuation quantity L of the variable optical attenuator 198 is controlled is controlled to becomes L=L0, by calculating the deviation (corresponding to L0) of the input optical signal per wavelength channel. By this process, the optical power of the output optical signal of the optical amplifier becomes the target value {PD1+(gain target value of entire optical amplifier)} by carrying out the AGC operation using the monitored values PD1 and PD3, even when the optical power of the input optical signal per wavelength channel changes.

[Processing Method P4]

According to the processing method P4, the monitored value PD3 and the output signal reference value are compared, and the attenuation quantity of the variable optical attenuator 198 is controlled so that an error between the compared values becomes zero. The optical amplifier calculates the following values which are necessary for the control, using the information related to the wavelength notified from the monitoring control unit which is provided on the upstream side of the optical amplifier.

Monitored Value PD3: z3 [dBm]
Information of Wavelength of Input Signal: N
Output Reference Value Per Wavelength Channel: A0 [dBm/ch]
Optical Power of Output Optical Signal: A=z3−10log(N) [dBm/ch]

The value A may be calculated by a microcontroller or the like, for example. The value A0 may be stored in a ROM, for example. In this embodiment of the optical amplifier, it is possible to control the optical power A of the output optical signal per wavelength channel by the attenuation quantity L of the variable optical attenuator 198. Hence, the ALC operation can be realized by controlling the attenuation quantity L of the variable optical attenuator 198 so that the optical power A of the output optical signal becomes A=A0. In this processing method P4, the attenuation quantity L of the variable optical attenuator 198 is L=L0 as in the case of the processing method P3.

The ALC operation may be carried out by controlling the attenuation quantity of the variable optical attenuator 198 so as to satisfy the target value of the processing method P3 or P4. Since the changing speed of the attenuation quantity of the variable optical attenuator 198 and the correcting speed of the monitored value PD1 become the same during the ALC operation, the EDF gain always takes a constant value even during the ALC operation. In other words, the gain tilt will not be generated during the ALC operation.

As described above with respect to the EDF gain of the second embodiment which is controlled constant, the EDF gain is controlled constant in this embodiment by controlling the attenuation quantity of the variable optical attenuator 198 to the target value.

Figure 12:
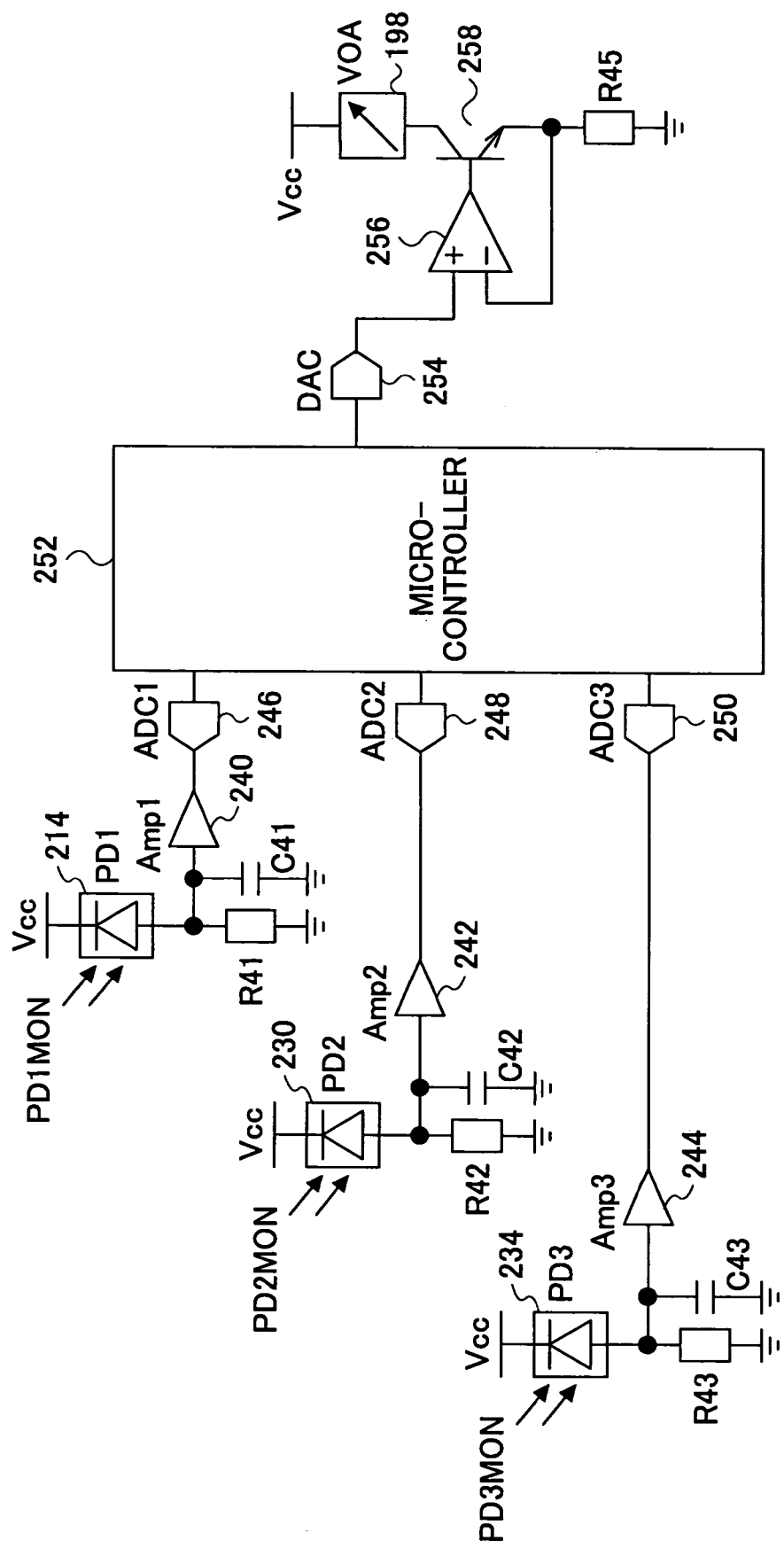
FIG. 12 is a diagram showing a third embodiment of the AGC circuit which controls the attenuation of a variable optical attenuator.

Next, a description will be given of a structure of the AGC circuit 218, by referring to FIG. 12. FIG. 12 is a diagram showing a third embodiment of the AGC circuit 218 which controls the attenuation of the variable optical attenuator 198. In FIG. 12, R41, R42, R43 and R45 denote resistors, and C41, C42 and C43 denote capacitors. The monitored values PD1, PD2 and PD3 are amplified by corresponding amplifiers 140, 142 and 244 having fixed gains, and the supplied to corresponding ADCs 246, 248 and 250. The ADCs 246, 248 and 250 convert the respective monitored values PD1, PD2 and PD3 into digital signals, and supply the digital signals to a microcontroller (or CPU) 252.

The microcontroller 252 calculates the EDF gain by adding the gain of the entire optical amplifier and the attenuation quantity of the variable optical attenuator 198. Hence, by driving the variable optical attenuator 198 so that the attenuation quantity thereof becomes a target value (VOA1_Loss target value) described by the following, the microcontroller 252 can control the EDF gain constant.

(VOA1_Loss Target Value)=(Gain of Entire Optical Amplifier)−(EDF Gain Target Value)

The microcontroller 252 calculates the target value of the attenuation quantity of the variable optical attenuator 198, and controls the variable optical attenuator 198 so that the attenuation quantity thereof becomes the target value. A control signal which is output from the microcontroller 252 so as to control the variable optical attenuator 198 is converted into a voltage signal by a DAC 254, and is supplied to a driving circuit for the variable optical attenuator 198. This driving circuit includes an amplifier 256, a transistor 258 and the resistor R45. In this third embodiment, it is only necessary to control the attenuation quantity of the variable optical attenuator 198 constant, because the EDF gain becomes the target value simultaneously as when the ALC operation is carried out.

Figure 13:
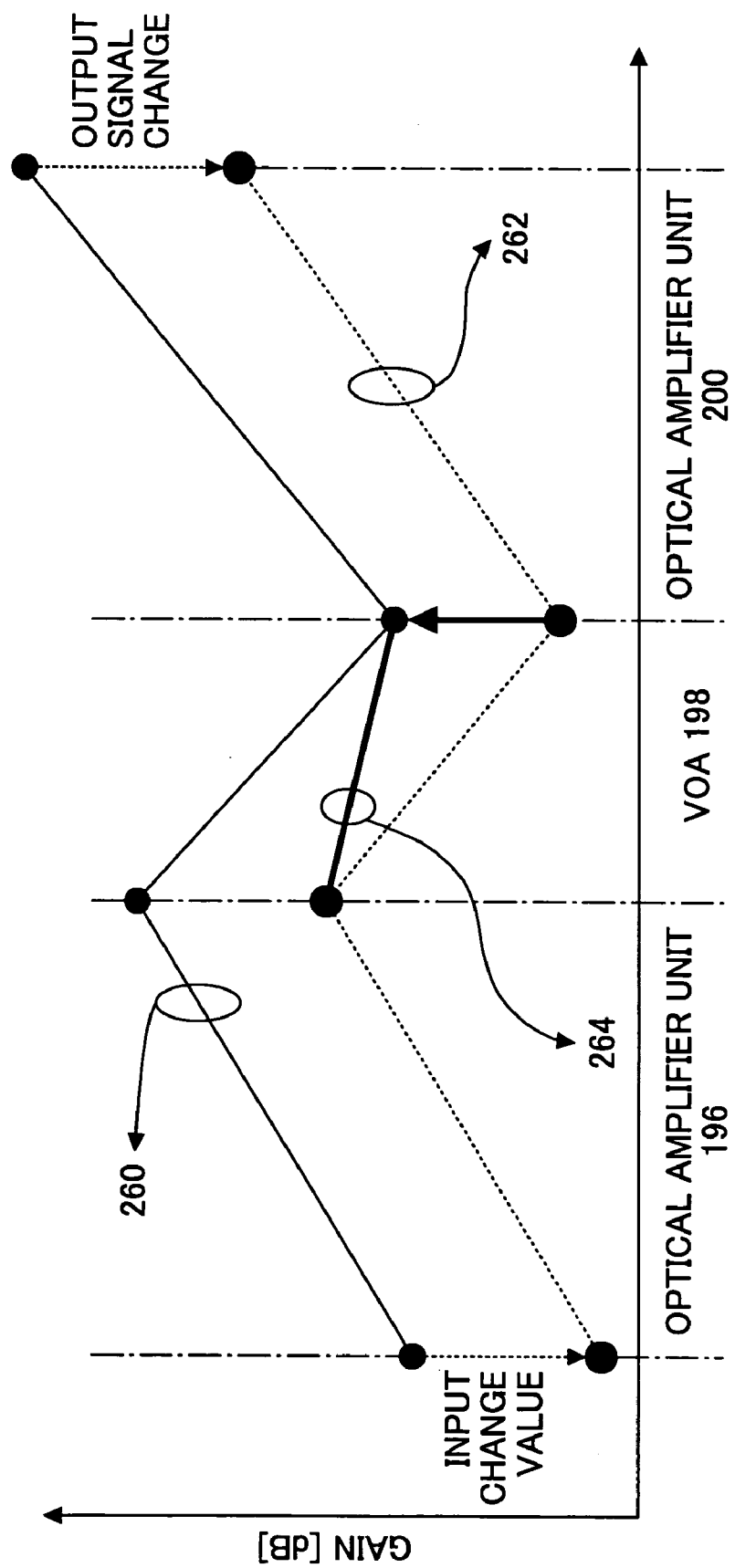
FIG. 13 is a diagram for explaining an operation of the optical amplifier shown in FIG. 11.

Next, a description will be given of the operation of the optical amplifier shown in FIG. 11, by referring to FIGS. 13 and 14. FIG. 13 is a diagram for explaining the operation of the optical amplifier, and FIG. 14 is a table showing each monitored values of the optical amplifier and changes in the attenuation quantity of the variable optical attenuator 198.

In FIG. 13, a graph 260 shows an initial setting control state where initial values are set so that the monitored values PD1 and PD2 have the same value when the input has the upper limit (or a level other than the upper limit). The attenuation quantity of the variable optical attenuator 198 is set to a value obtained by subtracting the EDF gain target value from the reference value of the gain of the entire optical amplifier.

A graph 262 shows an input change control state where a change is introduced in the input signal. The graph 262 changes so that the signal power is smaller than that of the graph 260.

A graph 264 shows a change correcting control state and a control state where the gain of the entire optical amplifier is controlled constant. The optical amplifier calculates the amount of change of the input signal, and controls the attenuation quantity of the variable optical attenuator 198 so as to correct the amount of change. When the attenuation quantity of the variable optical attenuator 198 is controlled by the ALC operation, the EDF gain becomes the target value. The amount of change of the input signal per wavelength channel is corrected by controlling the attenuation quantity of the variable optical attenuator 198. In addition, the gain of the entire optical amplifier is controlled constant by the AGC using the monitored values PD1 and PD3.

In FIG. 14, "X" indicates an input signal power, and "α" indicates an amount of change. Further, "L" indicates the attenuation quantity of the variable optical attenuator 198, and "A" indicates the gain of the entire optical amplifier.

Figure 15:
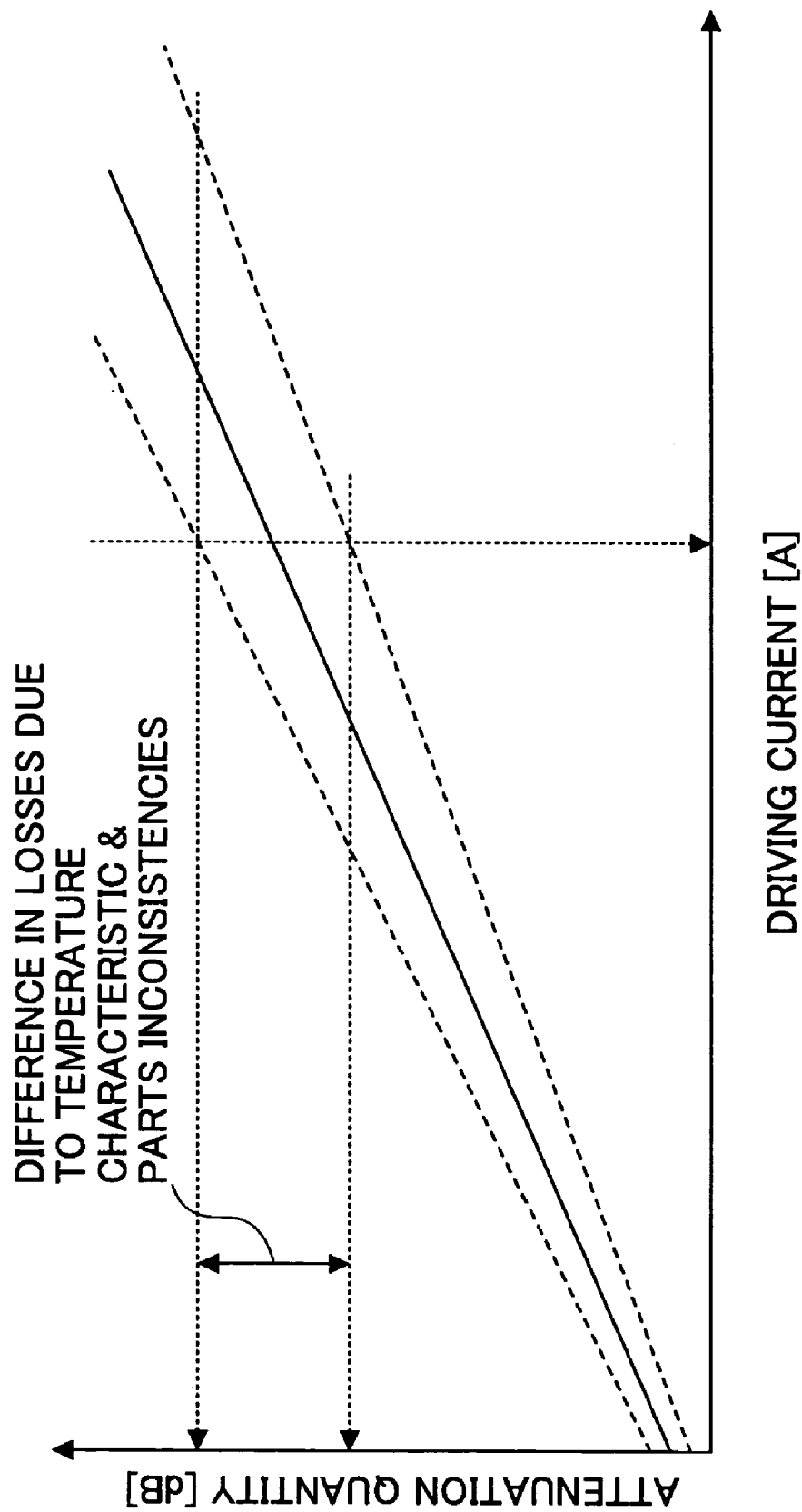
FIG. 15 is a diagram for explaining a change in an "attenuation quantity of the variable optical attenuator" versus "driving current (or driving voltage)" relationship due to inconsistencies and temperature characteristics of parts forming the optical amplifier.

In the second and third embodiments of the optical amplifier described above, the "attenuation quantity of the variable optical attenuator" versus "driving current (or driving voltage)" relationship changes due to inconsistencies and temperature characteristics of the parts forming the optical amplifier. Hence, the variable optical attenuator is controlled while monitoring the attenuation quantity from the monitored values, as shown in FIG. 15. FIG. 15 is a diagram for explaining the change in the "attenuation quantity of the variable optical attenuator" versus "driving current (or driving voltage)" relationship due to the inconsistencies and temperature characteristics of the parts forming the optical amplifier. In FIG. 15, the ordinate indicates the attenuation quantity [dB] of the variable optical attenuator, and the abscissa indicates the driving current [A].

However, if the optical amplifier is constructed to have the characteristics of the variable optical attenuator within the optical amplifier, it is possible to control the attenuation quantity of the variable optical attenuator by controlling the driving current of the variable optical attenuator. Hence, if the "attenuation quantity of the variable optical attenuator" versus "driving current (or driving voltage)" relationship is known in the second or third embodiment, the number of optical circuit parts may be reduced by constructing the optical amplifier as shown in FIGS. 16 through 19.

Figure 16:
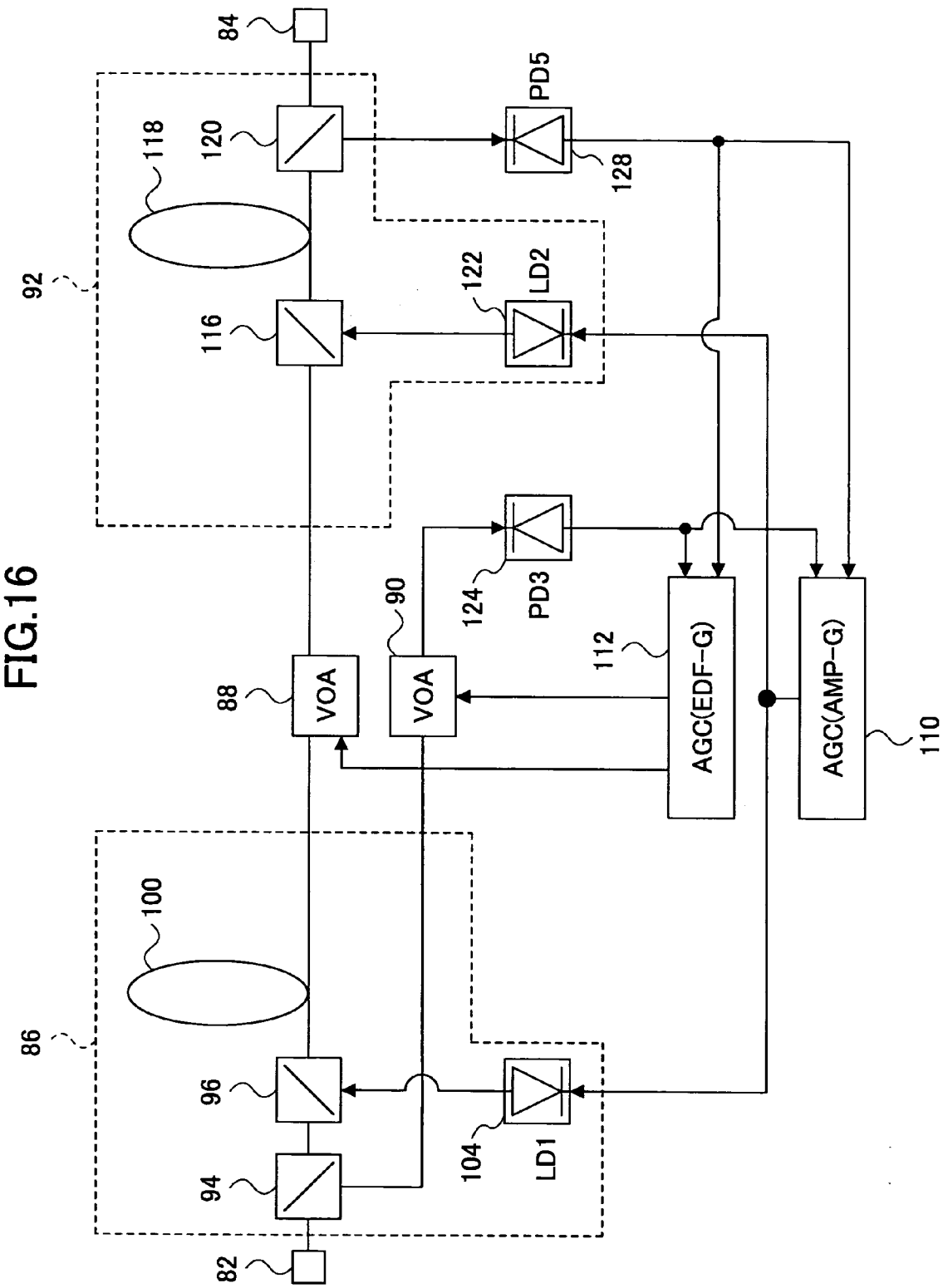
FIG. 16 is a system block diagram showing a fourth embodiment of the optical amplifier according to the present invention.

FIG. 16 is a system block diagram showing a fourth embodiment of the optical amplifier according to the present invention. In FIG. 16, those parts which are the same as those corresponding parts in FIG. 6 are designated by the same reference numerals, and a description thereof will be omitted. The optical amplifier shown in FIG. 16 differs from the optical amplifier shown in FIG. 6 in that the photodetectors 106, 108 and 126 shown in FIG. 6 are omitted. The optical amplifier shown in FIG. 16 stores the characteristics of the variable optical attenuators in the form of a table or function, and drives the variable optical attenuators based on a value which is processed by a microcontroller or the like.

The gain Amp_Gain of the entire optical amplifier, the EDF gain EDF_total_Gain, the attenuation quantity VOA1_Loss of the first variable optical attenuator 88, and the attenuation quantity VOA2_Loss of the second variable optical attenuator 90 may be obtained as follows using the monitored values PD3 and PD5. A sum of the monitored value PD3 and the attenuation quantity of the second variable optical attenuator 90 corresponds to the optical power of the input optical signal.

Amp_Gain=PD5−(PD3+VOA2_Loss)

EDF_total Gain=Amp_Gain+VOA1_Loss

The gain of the entire optical amplifier is controlled by driving the laser diodes 104 and 122 so that the gain of the entire optical amplifier calculated from the monitored values PD3 and PD5 becomes the desired value. Since the structure of the AGC circuit 110 is the same as that shown in FIG. 7, illustration and description thereof will be omitted.

Similarly to the second embodiment described above, the ALC operation calculates the change in the input optical signal per wavelength channel from the monitored value of the input optical signal and the output optical signal, and drives the first and second variable optical attenuators 88 and 90 using the calculated value as the target value.

Figure 17:
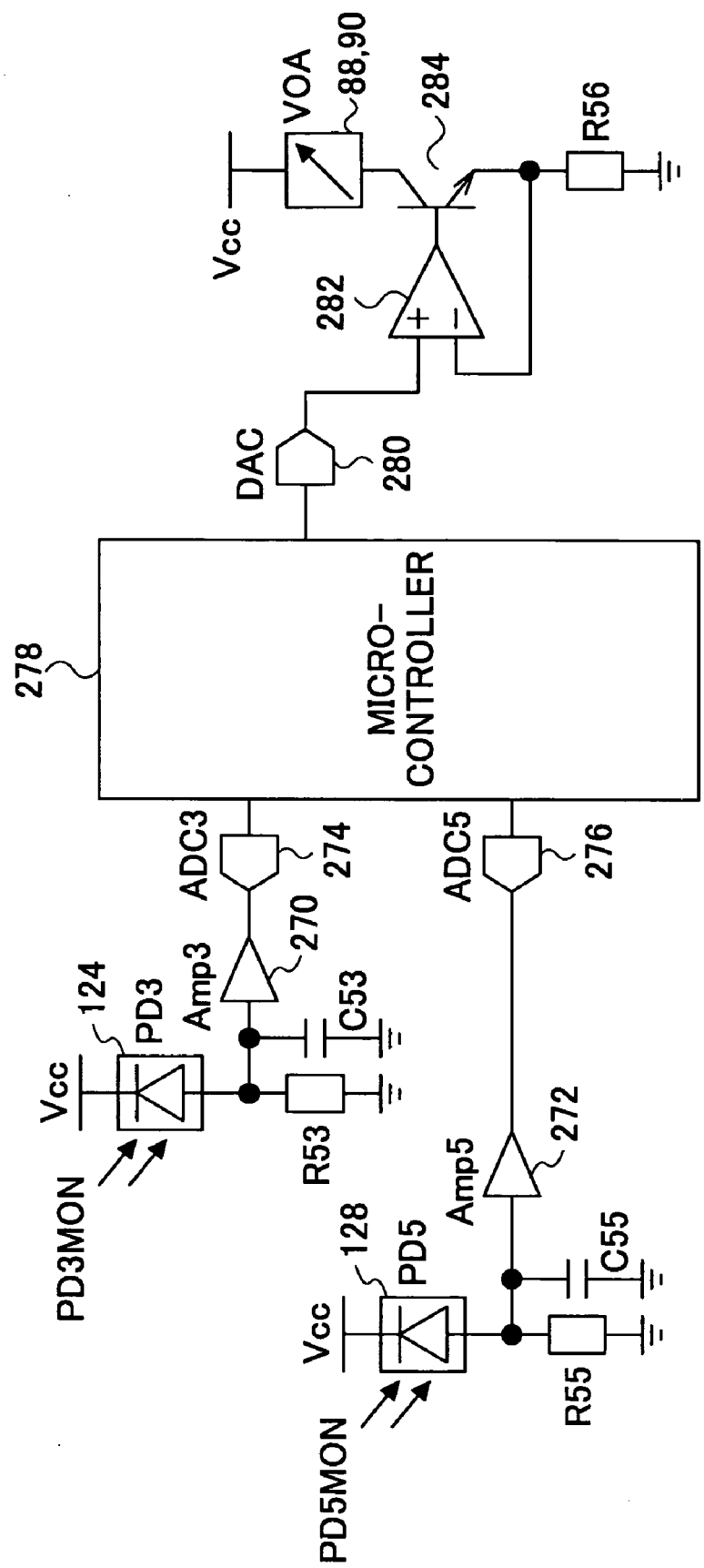
FIG. 17 is a diagram showing a fourth embodiment of the AGC circuit which controls the attenuations of the first and second variable optical attenuators.

Furthermore, the optical amplifier shown in FIG. 16 controls the EDF gain constant by using the AGC circuit 112 having a structure shown in FIG. 17. FIG. 17 is a diagram showing a fourth embodiment of the AGC circuit 112 which controls the attenuations of the first and second variable optical attenuators 88 and 90. In FIG. 17, R53, R55 and R56 denote resistors, and C53 and C55 denote capacitors.

The voltage signals from the photodetectors 124 and 128 are amplified in corresponding amplifiers 270 and 272 having fixed gains, and supplied to corresponding ADCs 274 and 276. The ADCs 274 and 276 convert the voltage signals from the respective photodetectors 124 and 128 into digital signals, and supply the digital signals to a microcontroller 278.

Similarly to the second embodiment described above, the microcontroller 278 can calculate the EDF gain by adding the gain of the entire optical amplifier and the attenuation quantity of the first variable optical attenuator 88. For this reason, by driving the first variable optical attenuator 88 so that the attenuation quantity of the first variable optical attenuator 88 becomes the target value VOA1_Loss, the microcontroller 278 can control the EDF gain constant.

(VOA1_Loss Target Value)=(Gain of Entire Optical Amplifier)−(EDF Gain Target Value)

The microcontroller 278 calculates the target value of the attenuation quantity of the first variable optical attenuator 88, and controls the first variable optical attenuator 88 so that the attenuation quantity thereof becomes the target value. A control signal which is output from the microcontroller 278 so as to control the first variable optical attenuator 88 is converted into a voltage signal by a DAC 280, and is supplied to a driving circuit for the first variable optical attenuator 88. This driving circuit includes an amplifier 282, a transistor 284 and the resistor R56.

Next, a description will be given of the operation of the optical amplifier shown in FIG. 16, by referring to FIG. 18. FIG. 18 is a table showing each monitored values of the optical amplifier and changes in attenuation quantities of the first and second variable optical attenuators 88 and 90.

The optical amplifier shown in FIG. 16 sets the attenuation quantity of the second variable optical attenuator 90 and the monitored value PD1 when the input has the upper limit (or a level other than the upper limit). The attenuation quantity of the first variable optical attenuator 88 is set to the initial value stored in the ROM, for example.

When the change is generated in the input optical signal, the optical amplifier calculates the amount of change of the input optical signal, and controls the attenuation quantity of the second variable optical attenuator 90 so as to correct the amount of change. The amount of change of the input optical signal per wavelength channel is corrected by the control of the attenuation quantity of the second variable optical attenuator 90. In addition, the gain of the entire optical amplifier is controlled constant by the AGC using the monitored values PD3 and PD5, and the attenuation quantity of the first variable optical attenuator 88 is controlled so as to maintain the EDF gain target value.

In FIG. 18, "X" indicates an input signal power, and "α" indicates an amount of change. Further, "L1" indicates the attenuation quantity of the first variable optical attenuator 88, "L2" indicates the attenuation quantity of the second variable optical attenuator 90, and "A" indicates the gain of the entire optical amplifier.

Figure 19:
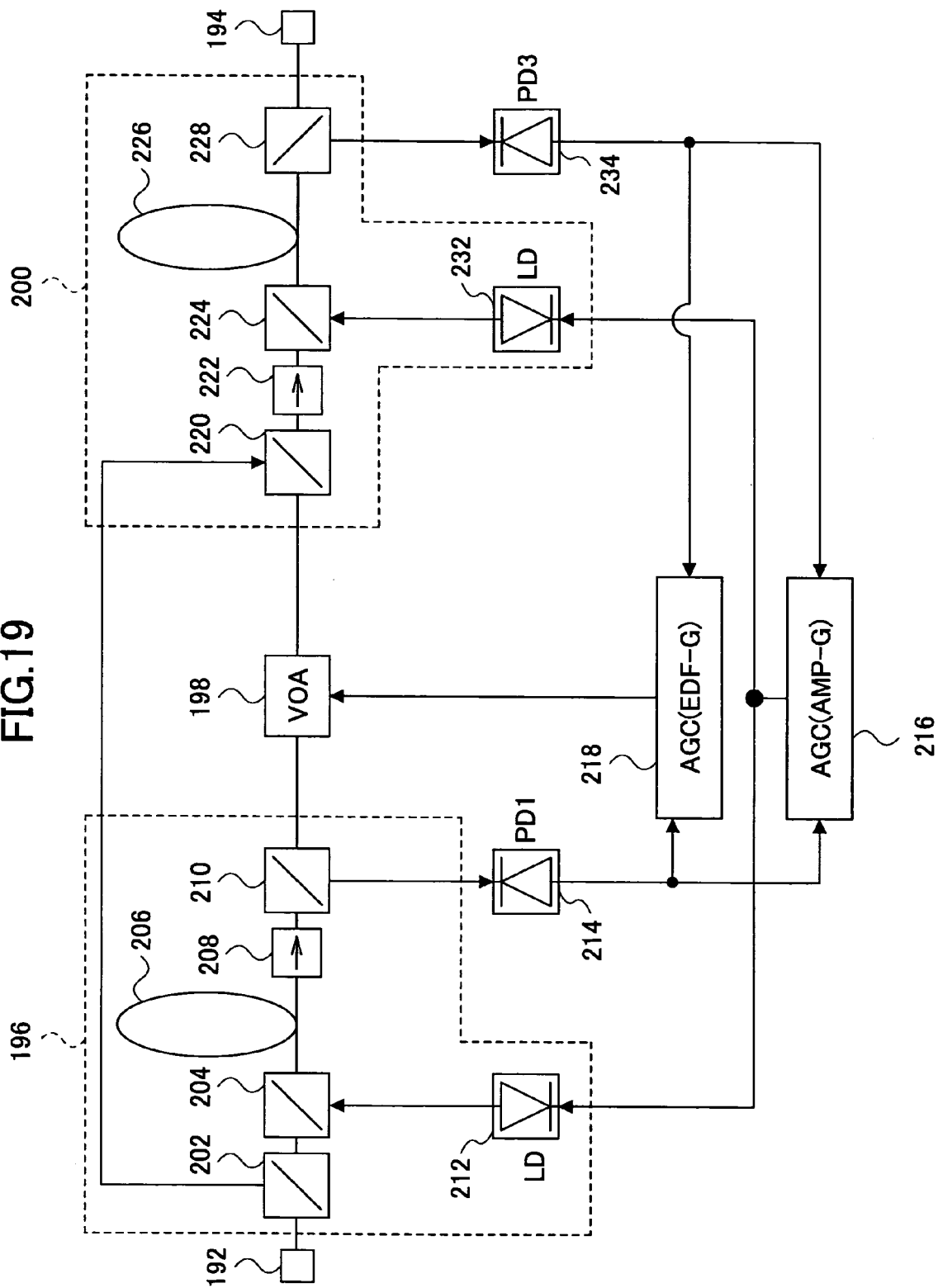
FIG. 19 is a system block diagram showing a fifth embodiment of the optical amplifier according to the present invention.

FIG. 19 is a system block diagram showing a fifth embodiment of the optical amplifier according to the present invention. In FIG. 19, those parts which are the same as those corresponding parts in FIG. 11 are designated by the same reference numerals, and a description thereof will be omitted. The optical amplifier shown in FIG. 19 differs from the optical amplifier shown in FIG. 11 in that the photodetector 230 shown in FIG. 11 is omitted. The optical amplifier shown in FIG. 19 stores the characteristics of the variable optical attenuator in the form of a table or function, and drives the variable optical attenuator based on a value which is processed by a microcontroller or the like.

The gain Amp_Gain of the entire optical amplifier, the EDF gain EDF_total_Gain, and the attenuation quantity VOA_Loss of the variable optical attenuator 198 may be obtained as follows using the monitored values PD1 and PD3. A sum of the monitored value PD1 and the attenuation quantity of the variable optical attenuator 198 corresponds to the optical power of the input optical signal.

$$Amp\_Gain = PD3 - (PD1 + VOA\_Loss)$$

$$EDF\_total\_Gain = Amp\_Gain + VOA\_Loss$$

The gain of the entire optical amplifier is controlled by driving the laser diodes 212 and 232 so that the gain of the entire optical amplifier calculated from the monitored values PD1 and PD3 becomes the desired value. Since the structure of the AGC circuit 216 is the same as that shown in FIG. 7, illustration and description thereof will be omitted.

Similarly to the second embodiment described above, the ALC operation calculates the change in the input optical signal per wavelength channel from the monitored value of the input optical signal and the output optical signal, and drives the variable optical attenuator 198 using the calculated value as the target value.

Furthermore, the optical amplifier shown in FIG. 19 controls the EDF gain constant by using the AGC circuit 218 having a structure shown in FIG. 12. The voltage signals from the photodetectors 214 and 234 are amplified in the corresponding amplifiers 240 and 244 having fixed gains, and supplied to the corresponding ADCs 246 and 250. The ADCs 246 and 250 convert the voltage signals from the respective photodetectors 214 and 234 into digital signals, and supply the digital signals to the microcontroller 252.

Similarly to the third embodiment described above, the microcontroller 252 can calculate the EDF gain by adding the gain of the entire optical amplifier and the attenuation quantity of the variable optical attenuator 198. For this reason, by driving the variable optical attenuator 198 so that the attenuation quantity of the variable optical attenuator 198 becomes the target value VOA_Loss, the microcontroller 252 can control the EDF gain constant.

$$(VOA\_Loss\ Target\ Value) = (Gain\ of\ Entire\ Optical\ Amplifier) - (EDF\ Gain\ Target\ Value)$$

The microcontroller 252 calculates the target value of the attenuation quantity of the variable optical attenuator 198, and controls the variable optical attenuator 198 so that the attenuation quantity thereof becomes the target value. A control signal which is output from the microcontroller 252 so as to control the variable optical attenuator 198 is converted into a voltage signal by the DAC 254, and is supplied to the driving circuit for the variable optical attenuator 198. This driving circuit includes the amplifier 256, the transistor 258 and the resistor R5.

Next, a description will be given of the operation of the optical amplifier shown in FIG. 19, by referring to FIG. 20. FIG. 20 is a table showing each monitored values of the optical amplifier and changes in attenuation quantities of the variable optical attenuator 198.

The optical amplifier shown in FIG. 19 sets the attenuation quantity of the variable optical attenuator 198 and the monitored value PD1 when the input has the upper limit (or a level other than the upper limit). The attenuation quantity of the variable optical attenuator 198 is set to the initial value stored in the ROM, for example.

When the change is generated in the input optical signal, the optical amplifier calculates the amount of change of the input optical signal, and controls the attenuation quantity of the variable optical attenuator 198 so as to correct the amount of change. The amount of change of the input optical signal per wavelength channel is corrected by the control of the attenuation quantity of the variable optical attenuator 198. In addition, the gain of the entire optical amplifier is controlled constant by the AGC using the monitored values PD1 and PD3, and the attenuation quantity of the variable optical attenuator 198 is controlled so as to maintain the EDF gain target value.

In FIG. 20, "X" indicates an input signal power, and "α" indicates an amount of change. Further, "L" indicates the attenuation quantity of the variable optical attenuator 198, and "A" indicates the gain of the entire optical amplifier.

Therefore, according to this embodiment, the wavelength characteristic of the gain is maintained constant for the entire optical amplifier, by controlling the variable optical attenuator 198. Hence, compared to the conventional case where the wavelength characteristic of the gain is maintained constant by carrying out the AGC with respect to each of the plurality of optical amplifier units, it is possible to cope with a high-speed AGC because the structure related to the control of the optical amplifier is simplified.

In addition, since the structure related to the control of the optical amplifier is simple, it is possible to reduce the number of required parts. As a result, this embodiment of the optical amplifier can greatly reduce the cost of the optical amplifier due to the reduced number of required parts, and also reduce the mounting surface area due to the reduced number of required parts.

Further, the present invention is not limited to these embodiments, but various variations and modifications may be made without departing from the scope of the present invention.

What is claimed is:

1. An optical amplifier comprising:
   an optical coupler to branch an input light;
   a first optical amplifier unit to amplify one of the branched light of the optical coupler;
   a first variable optical attenuator to attenuate an output of the first optical amplifier unit;
   a second optical amplifier unit to amplify an output light of the first variable optical attenuator;
   a second variable optical attenuator to attenuate another branched light of the optical coupler;
   a first control unit to control gains of the first and second optical amplifier units based on an output of the second variable optical attenuator and an output of the second optical amplifier unit; and
   a second control unit to control attenuation quantities of the first and second variable optical attenuators based on the input and the output of the first optical amplifier unit and an input and the output of the second optical amplifier unit.

2. The optical amplifier as claimed in claim 1, further comprising:
   first and second photodetectors to convert the input and the output of the first optical amplifier unit into electrical signals;
   a third photodetector to convert the output of the second variable optical attenuator into an electrical signal; and
   fourth and fifth photodetectors to convert the input and the output of the second optical amplifier unit into electrical signals,
   said third and fifth photodetectors supplying the electrical signals output therefrom to the first control unit,
   said first, second, fourth and fifth photodetectors supplying the electrical signals output therefrom to the second control unit.

3. The optical amplifier as claimed in claim 1, wherein the first control unit controls the gains of the first and second optical amplifier units so that an output power of said optical amplifier becomes constant, and the second control unit controls the attenuation quantities of the first and second variable optical attenuators so that a sum of the gains of the first and second optical amplifier units becomes constant.

4. The optical amplifier as claimed in claim 3, wherein:
- each of the first and second optical amplifier units includes an optical amplifying medium and a pump light source to supply a pump light to the optical amplifying medium, and
- the gain of each of the first and second optical amplifier units is controlled by an optical power of the pump light output from the pump light source thereof.

5. An optical amplifier control method for controlling an optical amplifier having an optical coupler to branch an input light, an optical amplifier unit to amplify one of the branched light of the optical coupler, a first variable optical attenuator to attenuate an output of the first optical amplifier unit, a second optical amplifier to amplify an output light of the first variable optical attenuator, and a second variable optical attenuator to attenuate another branched light of the optical coupler, comprising:
- controlling gains of the first and second optical amplifier units based on an output of the second variable optical attenuator and an output of the second optical amplifier unit; and
- controlling attenuation quantities of the first and second variable optical attenuators based on the input and the output of the first optical amplifier unit and an input and the output of the second optical amplifier unit.

* * * * *